US012613117B2

(12) United States Patent
Lim et al.

(10) Patent No.: US 12,613,117 B2
(45) Date of Patent: **\*Apr. 28, 2026**

(54) MULTIPHASE FLOWMETER APERTURE ANTENNA TRANSMISSION AND PRESSURE RETENTION

(71) Applicant: Schlumberger Technology Corporation, Sugar Land, TX (US)

(72) Inventors: Yu Ke Lim, Singapore (SG); Shasha Wang, Singapore (SG); Linyuan Zhan, Singapore (SG); Muhammad Fuad Bin Mohamed Zain, Singapore (SG); Kenny Shin Han Wei, Singapore (SG); Guillaume Jolivet, Clamart (FR); Cheng-Gang Xie, Singapore (SG)

(73) Assignee: Schlumberger Technology Corporation, Sugar Land, TX (US)

( \* ) Notice: Subject to any disclaimer, the term of this patent is extended or adjusted under 35 U.S.C. 154(b) by 279 days.

This patent is subject to a terminal disclaimer.

(21) Appl. No.: 18/507,142

(22) Filed: Nov. 13, 2023

(65) Prior Publication Data

US 2024/0077343 A1     Mar. 7, 2024

Related U.S. Application Data

(63) Continuation of application No. 17/331,698, filed on May 27, 2021, now Pat. No. 11,835,371.
(Continued)

(51) Int. Cl.
G01F 1/58 (2006.01)
G01F 1/60 (2006.01)
(Continued)

(52) U.S. Cl.
CPC ............... G01F 1/586 (2013.01); G01F 1/60 (2013.01); G01F 15/063 (2013.01); G08C 17/02 (2013.01);
(Continued)

(58) Field of Classification Search
CPC .......... G01F 1/586; G01F 1/60; G01F 15/063; G01F 1/66; G01F 1/662; G01F 1/74;
(Continued)

(56) References Cited

U.S. PATENT DOCUMENTS 3,886,549 A     5/1975 Cheal
5,006,785 A     4/1991 Revus
(Continued)

OTHER PUBLICATIONS

Sensia, Caldon Ultrasonics LEFM 2xxCi Family of Ultrasonic Flowmeters with G3 Transmitters, User Manual Safety Manual, Aug. 2021.

(Continued)

*Primary Examiner* — Peter J Macchiarolo
*Assistant Examiner* — John M Royston
(74) *Attorney, Agent, or Firm* — Jeffrey D. Frantz

(57) ABSTRACT

Multiphase flowmeter aperture antenna transmission and pressure retention are disclosed herein. An example apparatus includes at least one radiating element to transmit or receive an electromagnetic signal along a measurement plane orthogonal to a direction of flow of the fluid in the vessel; a pressure retaining member to prevent fluid from entering the aperture antenna assembly through a measurement window of the aperture antenna assembly, at least a portion of the pressure retaining member to separate the radiating element and the fluid; and a metal housing with or without slits, the pressure retaining member to be at least partially within the metal housing, the radiating element to be coupled to the metal housing.

14 Claims, 14 Drawing Sheets

Related U.S. Application Data

(60) Provisional application No. 62/704,805, filed on May 29, 2020.

(51) Int. Cl.

| | |
|---|---|
| *G01F 1/66* | (2022.01) |
| *G01F 1/74* | (2006.01) |
| *G01F 15/063* | (2022.01) |
| *G08C 17/02* | (2006.01) |
| *H01Q 1/00* | (2006.01) |
| *H01Q 1/22* | (2006.01) |
| *H01Q 1/42* | (2006.01) |

(52) U.S. Cl.
CPC ............... *H01Q 1/002* (2013.01); *H01Q 1/42* (2013.01); *G01F 1/66* (2013.01); *G01F 1/662* (2013.01); *G01F 1/74* (2013.01); *H01Q 1/22* (2013.01)

(58) Field of Classification Search
CPC .......... G08C 17/02; H01Q 1/002; H01Q 1/42; H01Q 1/22
USPC ...................................................... 73/861.12
See application file for complete search history.

(56) References Cited

U.S. PATENT DOCUMENTS

| | | | | |
|---|---|---|---|---|
| 5,157,339 A | * | 10/1992 | Scott | ...................... G01N 22/00 73/61.43 |
| 5,263,363 A | * | 11/1993 | Agar | .................... G01N 27/223 73/61.44 |
| 5,625,293 A | * | 4/1997 | Marrelli | ................. G01N 22/04 73/61.41 |
| 5,644,244 A | * | 7/1997 | Marrelli | ................. G01N 22/00 324/637 |
| 5,793,216 A | | 8/1998 | Constant | |
| 7,908,930 B2 | | 3/2011 | Xie | |
| 8,536,883 B2 | | 9/2013 | Xie | |
| 2008/0319685 A1 | | 12/2008 | Xie | |
| 2017/0016750 A1 | | 1/2017 | Edward | |
| 2019/0145910 A1 | | 5/2019 | Alvarez | |
| 2019/0301280 A1 | | 10/2019 | Xiao | |
| 2021/0372834 A1 | | 12/2021 | Lim | |

OTHER PUBLICATIONS

Balanis, C. A., Antenna theory: analysis and design, Fourth ed., Hoboken, New Jersey, John Wiley, 2016, Chapter 12, p. 683, 9 pages.
Pozar, D. M., Microwave engineering, 3rd ed. (no. Book, Whole). Hoboken, NJ: John Wiley, 2004, Chapter 3, p. 129, 81 pages.
Collin, R. E., Field Theory of Guided Waves, 2nd; ed. John Wiley Sons, 1990, Chapter 7, pp. 471-483, 86 pages.

* cited by examiner

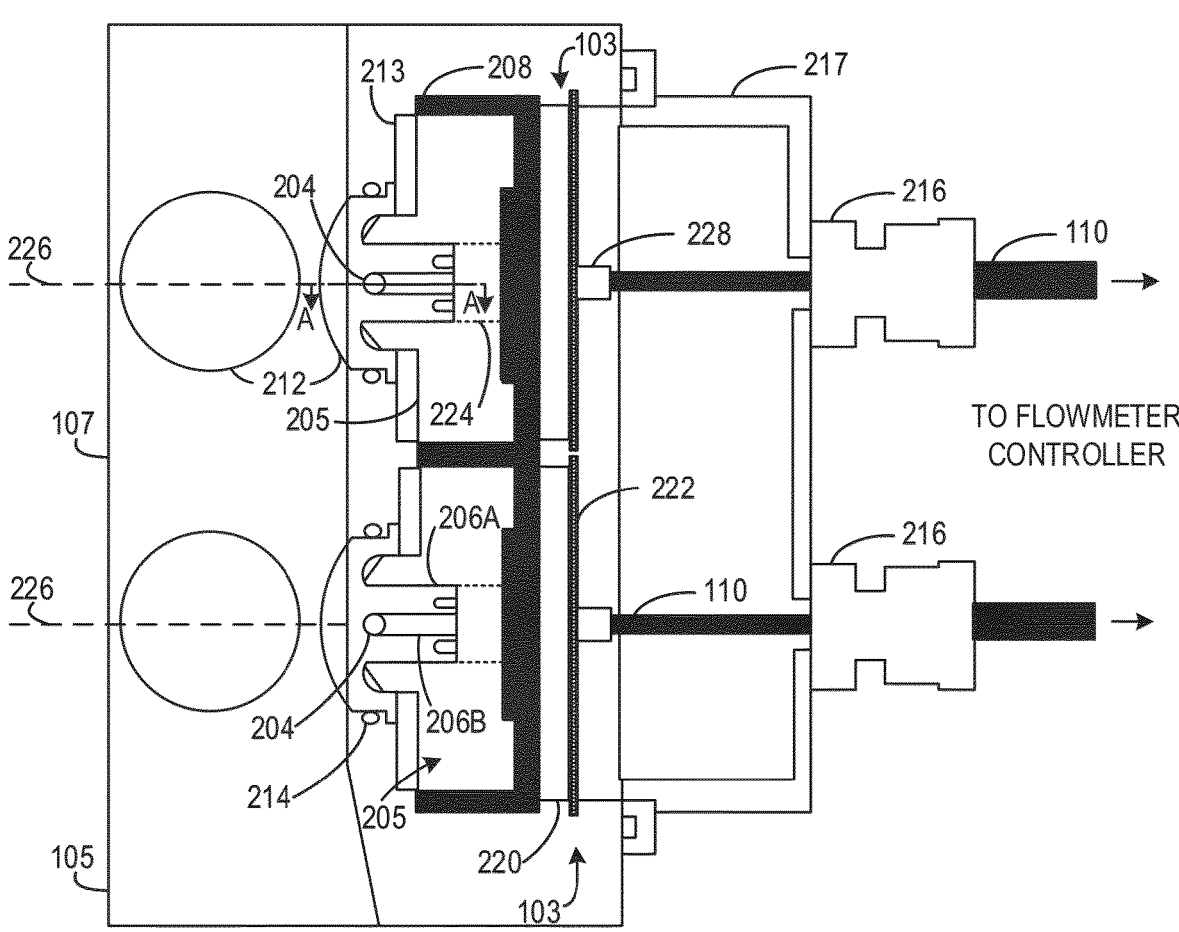
TO FLOWMETER
CONTROLLER
FIG. 2

500

506

204

510

504

416

402

508     508

503

502

TO FLOWMETER CONTROLLER

110

103

105

222

616

226

220

208

205

614

615

212

214

612

610

302

107

A-A

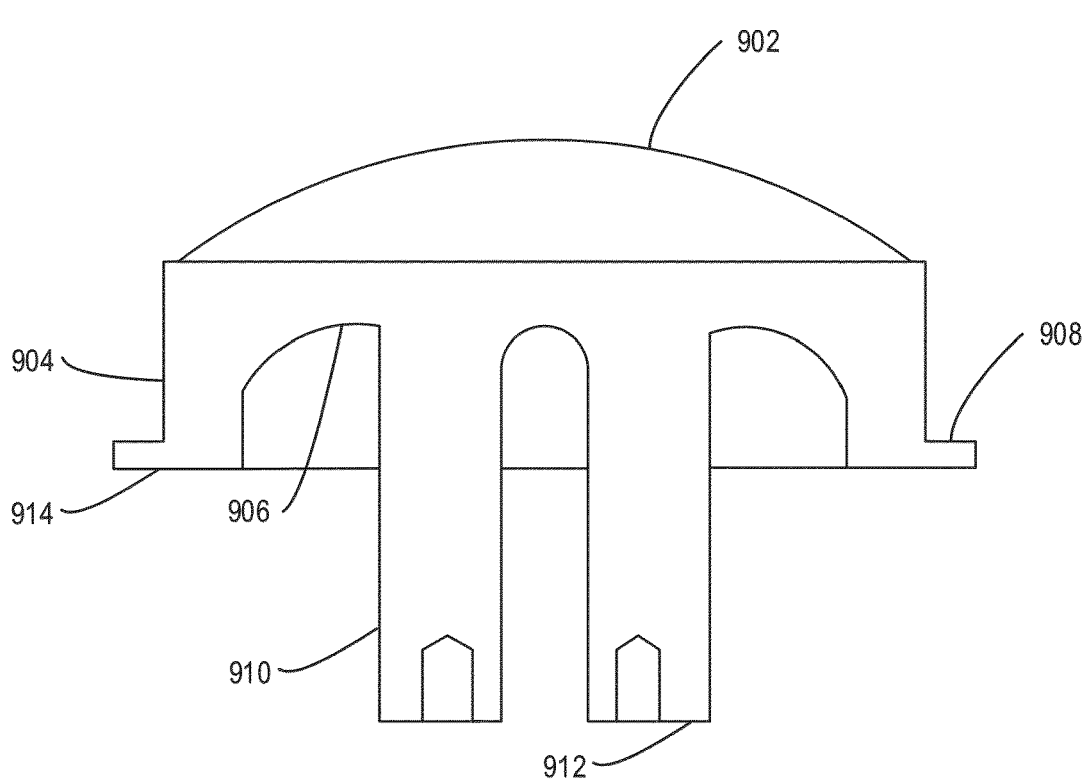
FIG. 9

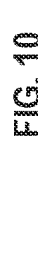

FIRST APERTURE ANTENNA ASSEMBLY 102A

104 ——

PROCESS CONTROL SYSTEM — 116

FLOWMETER TRANSMITTER — 108

FLOWMETER CONTROLLER MICROWAVE ELECTRONICS

114 — COMPUTING DEVICE(S)

106

103A

RF CABLE — 110A

222A — RETAINING MEMBER
220A — ELASTIC MEMBER
CONDUCTOR SHIELD — 205A
208A — METAL HOUSING
304A — CAVITY FILLER
214A — RADIATING ELEMENT — 204A
SEAL
MEASUREMENT WINDOW
212A — 226
212B

THROAT 107 OF VESSEL 105

SECOND APERTURE ANTENNA ASSEMBLY 102B

FLOWMETER TRANSMITTER — 108

PROCESS CONTROL SYSTEM — 116

FLOWMETER CONTROLLER MICROWAVE ELECTRONICS — 104

106

103B

RF CABLE — 110B

204B — MEASUREMENT WINDOW
214B — RADIATING ELEMENT
SEAL
304B — CAVITY FILLER
208B — METAL HOUSING
205B — CONDUCTOR SHIELD
220B — ELASTIC MEMBER
222B — RETAINING MEMBER

114 — COMPUTING DEVICE(S)

DIRECTION OF FLUID FLOW

MULTIPHASE FLOWMETER APERTURE ANTENNA TRANSMISSION AND PRESSURE RETENTION

This application is a continuation patent application of U.S. Non-Provisional Patent Application having application Ser. No. 17/331,698 filed 27 May 2021, which claims priority to and the benefit of a U.S. Provisional Application having Application No. 62/704,805, filed 29 May 2020, which is incorporated by reference herein.

BACKGROUND

This disclosure relates generally to flowmeters and, more particularly, to multiphase flowmeter aperture antenna transmission and pressure retention.

DESCRIPTION OF THE RELATED ART

Hydrocarbons are widely used as a primary source of energy and have a great impact on the world economy. Consequently, the discovery and efficient production of hydrocarbon resources is increasingly noteworthy. As relatively accessible hydrocarbon deposits are depleted, hydrocarbon prospecting and production has expanded to new regions that may be more difficult to reach and/or may pose new technological challenges. During typical operations, a borehole is drilled into the earth, whether on land or below the sea, to reach a reservoir containing hydrocarbons. Such hydrocarbons are typically in the form of oil, gas, water, or mixtures thereof that may be brought to the surface through the borehole.

Well testing or production monitoring is often performed to evaluate a potential or current production value of a reservoir. During well testing, a test well is drilled to produce a test flow of fluid from the reservoir. During the test flow, flow rates of oil, gas and water, and the parameters of the mixture, such as a water-liquid ratio and a liquid-gas ratio, are typically measured along a portion of the borehole over time to indicate the well production and the contents of the mixture. The flow rates and the mixture parameters may be determined during various types of well tests, such as pressure drawdown, interference, reservoir limit tests, and other tests generally known by those skilled in the art. The data collected during well testing may be used to characterize physical properties of the reservoir and assess the economic viability of the reservoir. The costs associated with performing the testing operations may be substantial. Therefore, testing operations should be performed as efficiently and economically as possible. The same is true for permanent production monitoring operations to evaluate the production flow rates of oil and/or gas wells of a reservoir.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

An example aperture antenna assembly of a multiphase flowmeter disclosed herein includes at least one radiating element to transmit or receive an electromagnetic signal along at least one measurement plane orthogonal to a direction of flow of the fluid in the vessel, a pressure retaining member to prevent the fluid from entering the aperture antenna assembly through a measurement window of the aperture antenna assembly, at least a portion of the pressure retaining member to separate the radiating element and the fluid, and a metal housing (with or without slits), the pressure retaining member to be at least partially within the metal housing, the radiating element to be coupled to the metal housing.

A multiphase flowmeter with a plurality of example aperture antenna assemblies to measure properties of a fluid in a vessel disclosed herein, including a first aperture antenna assembly according to the disclosure, wherein the at least one radiating element of the first aperture antenna is at least one first radiating element, a second aperture antenna assembly according to the disclosure, wherein the at least one radiating element of the second aperture antenna is at least one second radiating element, wherein the first aperture antenna assembly is coupled to a first side of the vessel and the second aperture antenna assembly is coupled to a second side of the vessel, wherein the at least one second radiating element includes one or more radiating elements respectively having one or more angular displacements with respect to the first radiating element, wherein the at least one first radiating element is configured to transmit an electromagnetic signal through the fluid, the at least one second radiating element is configured to receive the electromagnetic signal, and the at least one first radiating element is configured to receive at least a portion of the electromagnetic signal reflected by the fluid in the vessel.

An example pressure vessel apparatus of a multiphase flowmeter disclosed herein includes a pressure retaining measurement window having an outer face and a shoulder, the outer face flushed with an interior wall of a vessel, the outer face to be in fluid communication with a fluid included in the vessel, a seal to radially surround the shoulder of the pressure retaining measurement window, wherein the shoulder is substantially orthogonal to the outer face, an elastic member to provide a resistance force to the pressure retaining measurement window to counteract a fluid pressure within the vessel, a metal housing coupled between the pressure retaining measurement window and the elastic member, and a retaining member coupled to a side of the elastic member opposite the metal housing, the retaining member to maintain a relative position of the elastic member.

An example method disclosed herein includes transmitting an electromagnetic signal from a first radiating element on a first side of the pressure vessel into the pressure vessel based on a plurality of frequencies, receiving the electromagnetic signal at a second antenna radiating element at a second side of the pressure vessel, receiving a reflection of the electromagnetic signal at the first radiating element, determining first electromagnetic data based on receiving the reflection of the electromagnetic signal at the first radiating element, determining second electromagnetic data based on the second radiating element receiving the electromagnetic signal, and determining the properties of the multi-phase fluid based on at least one of the first electromagnetic data or the second electromagnetic data.

Various refinements of the features noted above may exist in relation to various aspects of the present embodiments. Further features may also be incorporated in these various aspects as well. These refinements and additional features may exist individually or in any combination. For instance, various features discussed below in relation to the illustrated embodiments may be incorporated into any of the above-described aspects of the present disclosure alone or in any combination. Again, the brief summary presented above is intended just to familiarize the reader with certain aspects and contexts of some embodiments without limitation to the claimed subject matter.

BRIEF DESCRIPTION OF THE DRAWINGS

FIG. 2 illustrates another view of the first example aperture antenna assembly of FIG. 1 and the first example pressure vessel apparatus of the example multiphase flowmeter of FIG. 1.

FIG. 9 illustrates an example pressure retaining measurement window that may be included in the example aperture antenna assembly of FIGS. 1, 2, and/or 3 and the example pressure vessel apparatus of FIGS. 1, 2, 6, 7, and/or 8.

FIG. 10 is a block diagram of an example implementation of an aperture antenna assembly on the example vessel of FIGS. 1 and/or 2.

DETAILED DESCRIPTION

Figure 1:
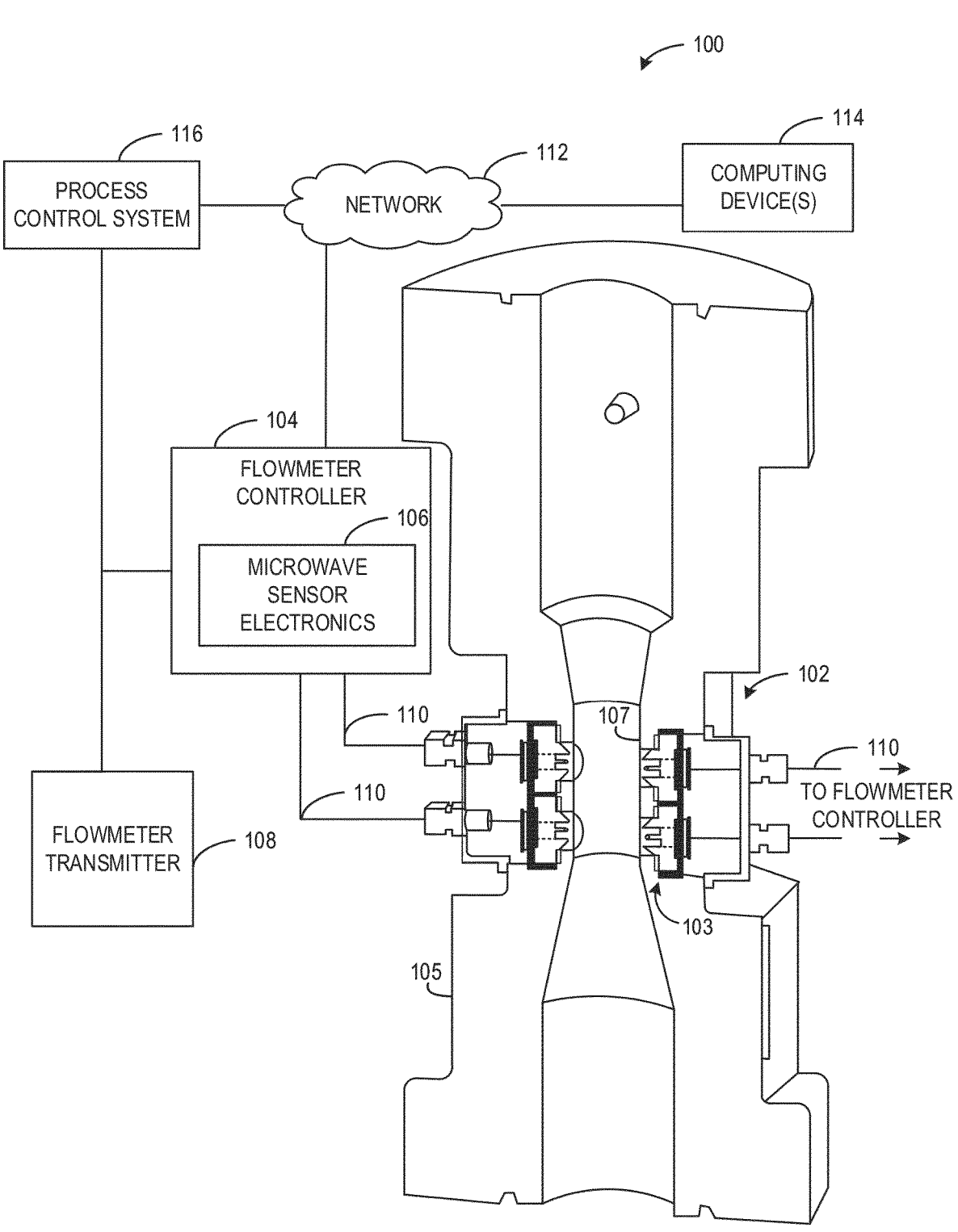
FIG. 1 illustrates an example multiphase flowmeter with a first example aperture antenna assembly with a first example pressure vessel apparatus coupled to an example vessel, and an example flowmeter controller.

It is to be understood that the present disclosure provides many different embodiments, or examples, for implementing different features of various embodiments. Specific examples of components and arrangements are described below for purposes of explanation and to simplify the present disclosure. These are, of course, merely examples and are not intended to be limiting.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not mandate any particular orientation of the components.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

Well testing or production monitoring is often performed to acquire data related to hydrocarbon properties of a well and identify or measure capabilities of the well to produce such hydrocarbons. During well testing, a test well is drilled to produce a test flow of fluid from an underground reservoir. During the test flow, parameters such as fluid pressure and fluid flow rate may be monitored over a period of time. The data collected during well testing, or during production monitoring for an existing well, may be used to assess the extraction of hydrocarbons from the reservoir and, thus, the economic viability and/or the current production value of the reservoir. Due to the substantial costs associated with performing well testing or production monitoring, testing or production monitoring operations should be performed as efficiently and economically as possible.

To efficiently and economically perform such well testing or production monitoring operations, some characteristics of the fluid(s) being produced may be determined such as, for example, the flow rate of the fluid. In some instances, the fluid(s) produced from a test well or a production well are multiphase fluids including water, oil, and/or gas. Determining the flow rate of a multiphase fluid may be more complex than determining the flow rate of a single-phase fluid.

In some instances, a vessel is implemented to transport the fluid(s) from the underground reservoir to a storage container at the surface. In some instances, a multiphase flowmeter implements a Venturi device along a portion of the vessel to allow flow of the fluid(s) to be analyzed. Some multiphase flowmeters have different Venturi throat sizes to facilitate different liquid and gas production flow rates.

Venturi throat inner diameter sizes may vary, where larger Venturi throat sizes may be used for higher-rate oil/gas wells and smaller Venturi throat sizes may be used for lower-rate oil/gas wells.

In some instances, a multiphase flowmeter is a gamma densitometer that utilizes gamma rays to determine parameters associated with the fluid in the vessel. In some instances, the gamma densitometer uses fluid and/or flow sensor(s) including a radioactive source of gamma rays, a gamma ray transmitter, a gamma ray detector, and a flow computer. The radioactive source of the gamma rays requires radioactivity safety measures to be implemented to meet regulatory requirements for safe handling, transportation, and operation.

Additionally, known pressure retaining systems of such gamma-ray based multiphase flowmeter may utilize a bolt-flange assembly for the gamma-ray measurement windows to create a preload proportional to a fluid pressure in the vessel and prevent a displacement of the pressure retaining components. However, the preload is typically increased by increasing the size of the bolts, increasing the strength of the bolts, and/or increasing the number of bolts, which further increases the size of the multiphase flowmeter and associated costs.

Examples disclosed herein include a multiphase flowmeter including an aperture antenna assembly to transmit and receive electromagnetic signals (e.g., radio frequency (RF) waves) that are used to determine parameters of the fluid within the vessel. In some disclosed examples, the aperture antenna assembly includes at least one radiating element to transmit and/or receive electromagnetic signals, a pressure vessel apparatus to prevent the fluid of the vessel from entering the aperture antenna without altering the flow, and a metal housing (e.g., a metal cavity housing) with or without slits. In some disclosed examples, the slits of the metal housing are parallel and/or perpendicular slits relative to the displacement of the radiating element that improve the signal level transmitted by the radiating element. As used herein, the term "pressure vessel apparatus" refers to a seal between the vessel and the aperture antenna that can also be operative as a measurement window through which electromagnetic signals propagate. In some disclosed examples, the aperture antenna assembly is positioned along a portion of the vessel at a throat section of a Venturi device to allow flow of the fluid(s) to be analyzed.

Examples disclosed herein include aperture antenna assemblies that produce low-power (e.g., 30 dBm or 1 Watt), RF electromagnetic signals to accurately measure parameters of a fluid within a vessel that, in some disclosed examples, has a relatively larger throat diameter. Examples disclosed herein remove the need for a gamma ray source and/or radioactivity safety measures to be implemented to meet regulatory requirements for safe handling, transportation, and operation. Examples disclosed herein include aperture antenna assemblies with improved pressure retention, via a pressure vessel apparatus, that prevents fluid from entering an aperture antenna of the aperture antenna assemblies without affecting flow within the vessel. Advantageously, examples disclosed herein can include aperture antenna assemblies having removable components to facilitate convenient testing, field repairs, and/or replacement of parts. In some disclosed examples, the pressure vessel apparatus can be tested prior to coupling electronic components to the vessel to reduce and/or otherwise eliminate the risk of damaging the electronic components.

In some disclosed examples, the aperture antenna assembly includes a first radiating element and a second radiating element positioned around the periphery of the vessel. For example, the first radiating element can transmit an electromagnetic signal into the vessel and the second radiating element can receive a transmission signal. The first radiating element can receive a reflection signal subsequent to the transmitted signal being reflected by the fluid in the vessel. As used herein, the term "radiating element" refers to an electrical component that can transmit and/or receive electromagnetic signals. For example, a radiating element can be a magnetic dipole with a conductor wire aligned in the flow direction, or with a conductor wire aligned perpendicular to the flow direction, arranged across the middle of a circular or non-circular (e.g. rectangular, square, triangular) antenna aperture. Additionally, a radiating element can be an electric dipole (e.g. a coaxial conductor, a patch antenna, etc.). In some disclosed examples, the radiating element is made of a beryllium copper, bronze, and/or brass conductor, with or without gold plating. In some disclosed examples, the radiating element includes one or more radiating elements disposed across the throat of section of the pressure vessel on a first measurement plane and/or a second measurement plane with one or more angular displacements. As used herein, the term "transmission signal" refers to an electromagnetic radio-frequency signal that is to be transmitted from one radiating element to a different radiating element (e.g., a different radiating element across the vessel). As used herein, the term "reflection signal" refers to an electromagnetic signal that is to be transmitted from a radiating element that can be received by the same radiating element after the signal has been reflected by a fluid in the vessel.

In some disclosed examples, a plurality of the radiating elements transmit (e.g., at least a transmitting antenna, a transmitter, etc.) and receive (e.g., at least a receiving antenna, a receiver, etc.) electromagnetic signals along a first measurement plane that is orthogonal to the direction of flow in the vessel. In some disclosed examples, the vessel includes a plurality of measurement planes. In some disclosed examples, a plurality of radiating elements is positioned around the periphery of the vessel. In some such disclosed examples, the radiating elements that receive the transmission signal (e.g., receiving antennae, receivers, etc.) are positioned with more than one angular displacement (e.g., 60°, 90°, 120°, 180°, etc.) with respect to the radiating element that transmits the electromagnetic signal. In some disclosed examples, a first radiating element (e.g., the transmitting antennae) disposed on the first measurement plane transmits the electromagnetic signals and a second radiating element(s) (e.g., the receiving antennae) disposed on the first measurement plane and/or a second measurement plane receives the electromagnetic signals. In general, the transmitting antennae can be disposed on the first measurement plane and/or the second measurement plane to transmit the electromagnetic signals to the receiving antennae positioned on a same measurement plane as the transmitting antennae or a different measurement plane. In some disclosed examples, magnitude and phase data is generated based on the transmission signals and/or reflection signals received by the radiating element(s) and communicated to a flowmeter controller. In some disclosed examples, the aperture antenna assembly measures a phase fraction (e.g., liquid or gas fraction), a water-liquid ratio (WLR), a salinity, a conductivity, and/or a permittivity based on magnitude and phase data of the electromagnetic signals.

Typically, measurements of the multiphase fluid are utilized to determine if the production system will produce, or continue to produce, hydrocarbons at an economically viable rate. Advantageously, in some disclosed examples, online continuous measurements of the multiphase fluid by the aperture antenna assembly and the differential pressure venturi device characterize physical properties of the reservoir and assess the economic viability of the reservoir. In some disclosed examples, the aperture antenna assembly measurements can provide flow assurance and detect potential issues in the reservoir and/or production system. In some disclosed examples, a choke valve is adjusted based on the measurements of the aperture antenna assembly and the venturi device to precisely control the flow rate.

In some disclosed examples, a pressure vessel apparatus (e.g., a pressure retaining member) meshes with an interior surface of the vessel and protects the radiating element from ingress of fluid within the vessel. The pressure vessel apparatus can include fewer and/or smaller components than a conventional bolt-flange assembly and, thus, reduces costs and a size of the aperture antenna assembly. In some disclosed examples, the pressure vessel apparatus includes a plug (e.g., a pressure retaining measurement window (PRMW)) that is flush (e.g., mesh) with an interior surface of the vessel that contains hydrocarbons. As used herein in the context of describing the surface and/or shape of a first object relative to a second object, the terms "flush" and "mesh" encompass a surface of the first object including geometry and/or curvature that substantially matches (e.g., substantially matches within a tolerance range of 0-1%) a surface of the second object. In some disclosed examples, a seal radially surrounds the pressure retaining measurement window. In some disclosed examples, the pressure retaining measurement window and additional components of the pressure vessel apparatus are preloaded to withstand a pressure exerted on the pressure retaining measurement window by the fluid within the vessel. In some such disclosed examples, additional components of the pressure vessel include an elastic member (e.g., a spring, a washer, etc.), a retaining member (e.g., a retaining ring, a screw, etc.), and/or a spacer (e.g., a metal housing) to support the pressure retaining measurement window against the pressure exerted by the fluid.

In some disclosed examples, the pressure vessel is preloaded by a bolt that is screwed and/or otherwise operatively coupled to the metal housing to compress the elastic member. In some such disclosed examples, the bolt is removed subsequent to applying the preload and, thus, can be used to preload more than one pressure vessel apparatus. In some such disclosed examples, removing the bolt subsequent to applying the preload further reduces the size of the pressure vessel apparatus, in addition to reducing passive electromagnetic interference or cross-talk, compared to the bolt-flange assembly.

In some disclosed examples, a metal housing is coupled to an exterior surface of the vessel to secure and protect the radiating element of the aperture antenna assembly and the pressure vessel apparatus, while also maintaining the stability and quality of the electromagnetic signal by electrically shielding the electromagnetic signal from background electromagnetic interference. In some disclosed examples, the metal housing, with advantageous electrical shielding, can include sets of appropriately cut (e.g., cut substantially parallel to the radiating element and/or cut substantially perpendicular to the radiating element) slits (e.g., gaps, openings, etc.) that enhance a field propagation of the electromagnetic signal through the fluids via constructive electromagnetic field interference inside a cavity of the metal housing. In some disclosed examples, sections of the metal housing are separated by slits. In some disclosed examples, a section (e.g., a middle section) of the metal housing is positioned between a set of slits (e.g., 2 or more slits) and is coupled to one end of the radiating element. In some disclosed examples, the middle section can be uncoupled from other sections of the metal housing and, thus, is removable to assist with repairs and replacements of components, such as the radiating element with a flange-mount RF coaxial connector with coaxial feedthrough.

FIG. 1 illustrates an example multiphase flowmeter 100 with a first example aperture antenna assembly 102 coupled to an example throat section 107 of an example vessel 105. The example aperture antenna assembly 102 includes a first example pressure vessel apparatus 103 located at the venturi throat section 107 of the vessel 105 described in further detail in connection with FIG. 2. The aperture antenna assembly 102 includes an example flowmeter controller 104 including example microwave sensor electronics 106, an example flowmeter transmitter 108, example electrical RF coaxial cables (e.g., RF coaxial cables and associated RF coaxial connectors) 110 with RF coaxial connectors, an example network 112, an example computing device(s) 114, and an example process control system 116. In FIG. 1, radiating elements of the aperture antenna assembly 102 transmit and receive electromagnetic signals (e.g., radio frequency waves) across the throat section 107 of the vessel 105 as a multiphase fluid from a reservoir flows through the vessel 105. In some examples, a first radiating element transmits the electromagnetic signal through the throat section 107 of the vessel 105 and receives a reflection signal after the fluid in the vessel reflects the signal. Additionally, a second radiating element receives a transmission signal after the electromagnetic signal travels through the multiphase fluid across the throat section 107 of the vessel 105, described in further detail in connection with FIG. 2.

In FIG. 1, example microwave sensor electronics 106 can generate and/or receive electromagnetic signals. In some examples, the microwave sensor electronics 106 are mounted on the vessel 105 and coupled to the radiating elements via the electrical RF coaxial cables 110. The electrical RF coaxial cables 110 transport the electromagnetic signals from one component (e.g., a signal generator, a signal receiver, etc.) of the aperture antenna assembly 102 to another component (e.g., a signal transmitter, a signal analyzer, etc.). The electrical RF coaxial cables 110 are coupled to the flowmeter controller 104 and the radiating elements of the aperture antenna assembly 102. The electrical RF coaxial cables 110 can forward the electromagnetic signals to be transmitted from the flowmeter controller 104 to the radiating elements and/or can provide the electromagnetic signal received by the radiating elements to the flowmeter controller 104.

In some examples, the electrical RF coaxial cables 110 carry the electromagnetic signals from the microwave sensor electronics 106 of the flowmeter controller 104 to the radiating elements and/or vice versa. In some examples, the microwave sensor electronics 106 measure magnitude (e.g., amplitude-attenuation) and phase-shift data of the electromagnetic signals at least one radio frequency from one or more radiating elements. In some such examples, the microwave sensor electronics 106 can determine flow parameters such as a water-liquid ratio (WLR) and/or a gas holdup (GHU) value based on the amplitude-attenuation and the phase-shift of the electromagnetic signals.

In FIG. 1, the flowmeter controller 104 delivers and/or otherwise transmits the electromagnetic signals to the flowmeter transmitter 108. In some disclosed examples, the flowmeter transmitter 108 utilizes flow parameters, data, etc., of the electromagnetic signals and pressure, temperature and Venturi differential-pressure signals upstream or downstream of the throat section 107, to determine measurements of the flow within the vessel 105. For example, the flowmeter transmitter 108 can receive flow parameters such as the WLR and/or GHU from the microwave sensor electronics 106, and flow pressure, temperature, and/or Venturi differential pressure of the multiphase fluid from a pressure sensor, a temperature sensor, and/or a differential pressure sensor (not shown). In the illustrated example of FIG. 1, the network 112 enables the flowmeter controller 104 to transmit the measurements of the microwave sensor electronics 106 and/or the flowmeter transmitter 108 to the computing device(s) 114 and/or the process control system 116. The network 112 of the illustrated example of FIG. 1 is the Internet. However, the network 112 can be implemented using any suitable wired and/or wireless network(s) including, for example, one or more data buses, one or more Local Area Networks (LANs), one or more wireless LANs, one or more cellular networks, one or more private networks, one or more public networks, etc. In some examples, the network 112 is a communication network channel, or a channel of a network.

In some examples, the computing device(s) 114 are representative of one or more computing devices that include programs (e.g., machine readable instructions representative of algorithms, functions, equations, etc.) to analyze the measurements from the flowmeter controller 104 and further determine flow properties of the multiphase fluid in the vessel 105. For example, the computing device(s) 114 can determine an oil flow rate, a gas flow rate, a water flow rate, a salinity, a permittivity, and/or a conductivity of the multiphase fluid.

In FIG. 1, the computing device(s) 114 and/or the flowmeter controller 104 can communicate the flow properties to the process control system 116 via the network 112. In some examples, the process control system 116 determines an adjustment to flow parameters of the multiphase fluid. For example, the process control system 116 can adjust a choke valve at the surface to control the flow rate and/or gas volume fraction within the vessel 105 based on the measured flow properties. In some examples, the process control system 116 can adjust a reservoir water-injection strategy to enhance oil recovery based on the measured flow parameters (e.g., changes in water salinity, changes in WLR) of the multiphase fluid of one or more production wells monitored by flowmeter(s). In some examples, the process control system 116 can optimize the production of a well implemented with an artificial lift system and monitored by a flowmeter, by reducing the gas volume fraction experienced by a downhole electric submersible pump, by adjusting the pump operating speed, and/or adjusting the opening of a gas-lift valve. In some examples, the process control system 116 may help shut or abandon the well if the well WLR is excessively high and, thus the well has no economic value to continue the production.

FIG. 2 illustrates another view of the first aperture antenna assembly 102 of FIG. 1 and the first pressure vessel apparatus 103 of the multiphase flowmeter 100 positioned at the throat section 107 of the vessel 105 of FIG. 1. The aperture antenna assembly 102 includes an example ingress protection cover 217 and example RF cable glands 216 to radially surround and secure the electrical RF coaxial cables (e.g., RF coaxial cables with SubMiniature Version A (SMA) 'male' connectors) 110 as they couple to example SMA connectors (e.g., RF SMA 'female' connectors) 228. Each SMA connector 228 is removably coupled to an example metal housing (e.g., a metal cavity housing) 205, which is surrounded by an example electrical conductor shield 208. In some examples, the metal housing 205 acts as the electrical conductor shield 208 and provides electrical shielding to protect the electromagnetic signals from interference. In other words, the metal housing 205 and conductor shield 208 are the same structure. Additionally, the aperture antenna assembly 102 includes example radiating elements 204 to transmit and/or receive electromagnetic signals across an example measurement plane 226 orthogonal to a direction of flow of fluid within the throat section 107 of the vessel 105 of FIG. 1. The pressure vessel apparatus 103 of FIG. 2 is a pressure retaining member that includes an example pressure retaining measurement window (PRMW) 212, example electrical conductor shims 213, an example seal 214, example cavity fillers 206A, 206B, the metal housing 205, an example elastic member 220, and an example retaining member 222.

In the illustrated example of FIG. 2, the radiating elements 204 can be transmitting antennae and/or receiving antennae that are positioned around the perimeter of the throat section 107 of the vessel 105. The pressure vessel apparatus 103 and the metal housing 205 protect and secure the radiating elements 204. In some examples, the radiating elements 204 can be one or more radiating conductors. In some examples, if the radiating element 204 is a transmitting antenna (e.g., a transmitter), the radiating element 204 transmits the electromagnetic signal into the throat section 107 of the vessel 105 across the measurement plane 226. In some such examples, the fluid within the throat section 107 of the vessel 105 reflects the transmission and the radiating element 204 receives a reflection of the electromagnetic signal (e.g., a reflection signal). In some examples, magnitude and phase data of the reflection signal can be utilized to determine a water-liquid ratio, in addition to other parameters, of the multiphase fluid within the vessel 105.

Additionally, in some examples, the radiating elements 204 that act as receiving antennae (e.g., receivers) are positioned across the throat section 107 of the vessel 105 with one or more angular displacement (e.g., 60°, 90°, 120°, 180°, etc.) in relation to the radiating element 204 that acts as the transmitting antenna. In some such examples, the receiving antennae receive the transmission of the electromagnetic signal (e.g., a transmission signal) from the transmitting antenna. The angular displacements of the radiating elements 204 that receive the transmission signals results in different magnitude and phase data due to the different spatial displacements and/or different gas fractions among the different transmitter-receiver pairs. For example, during a vertical upward flow of fluid gas tends to flow through the center of the vessel 105 causing different gas fractions to be measured by receivers with different angular displacements. In some examples, the magnitude and phase data of the transmission signals received by the receiving antennae is utilized to determine a gas phase fraction or gas holdup (GHU), in addition to other parameters such as WLR, of the multiphase fluid within the throat section 107 of the vessel 105.

In the cases described above including several radiating elements 204 arranged on the vessel 105, an aperture antenna assembly 102 including the pressure vessel apparatus 103 may be configured to include all radiating elements as described above. In an alternative, multiple antenna assemblies, each including one or more radiating elements 204 as for instance disclosed in relationship with FIG. 10, may be arranged on the vessel 105. In a particular embodiment, when a plurality of radiating elements are positioned with an angular and/or axial displacement relative to each other, each radiating element of the plurality is associated to a distinct aperture antenna assembly and pressure vessel apparatus 103.

In the illustrated example of FIG. 2, a first end of the radiating element 204 couples to the SMA connector 228 via a soldering connection or an interference fit. In some such examples, the SMA connector 228 includes a coaxial feed-through that is coupled the first end of the radiating element 204 and the electrical RF coaxial cable 110. As discussed in FIG. 1, the electrical RF coaxial cable 110 transports the electromagnetic signals to and from the radiating element 204 to the flowmeter controller 104. In some examples, the electrical RF coaxial cable 110 extends through the metal housing 205, via the SMA connector 228 with a coaxial feedthrough, to couple to the first end of the radiating element 204. In some such examples, an insulation ring radially surrounds the first end of the radiating element 204 to insulate the connection between the radiating element 204 and a center-conductor of the of SMA connector 228 and, thus insulate the center-conductor of electrical RF cable 110) from the metal housing 205, as discussed further in association with FIG. 5.

In some examples, the electrical RF coaxial cable 110 includes a first portion outside the metal housing 205 that couples to the SMA connector 228 attached to the metal housing 205. In some such examples, the SMA connector 228 can include a flange-mount that is secured to the metal housing 205 via screws. In the illustrated example, the electrical conductor shield 208 surrounds the SMA connector 228 and the associated flange-mount.

In FIG. 2, a second end of the radiating element 204 is coupled to the associated metal housing 205 via an interference fit. In some examples, the metal housing 205 is electrically coupled by a mechanical metal surface contact to an exterior surface of the vessel 105, which is composed of metal. In some such examples, the electrical coupling between the metal housing 205 and the vessel 105 and/or electrical shielding is enhanced by the electrical conductor shims 213. In some disclosed examples, the metal housing 205 can be intact without any cuts or slits. In some disclosed examples, to improve electromagnetic transmission signal between radiating elements 204 peripherally displaced over a large pipe and/or throat diameter, the metal housing 205 can include a first section, a second section, and a third section defined by example slits (e.g., gaps, openings, etc.) 224. In some such examples, the metal housing 205 can include a first set of slits 224 parallel to the radiating element 204. In some examples, the first set of slits 224 can completely separate and/or otherwise isolate the second section (e.g., the middle section) from the first and third sections of the metal housing 205 as discussed further in association with FIGS. 4A-4B.

In some examples, the middle section of the metal housing 205 includes the coaxial feedthrough of the SMA connector 228 to provide electromagnetic signals transported by the electrical RF cable 110 to the radiating element 204 within the metal housing 205. Additionally, the flange and screws associated with the flange-mount of the SMA connector 228 couple to the first and third sections of the metal housing 205. In some examples, the second section of the metal housing 205 couples to the second end of the radiating element 204. In some such examples, the second section of the metal housing 205 and the radiating element 204 can be removed from the exterior surface of the vessel when the screws associated with the flange-mount SMA connector 228 are uncoupled from the first and third sections of the metal housing 205.

In some examples, the metal housing 205 can include a second set of slits (not shown) that extend partially through the first and third section of the metal housing 205 to form cross-cut slits. In some such examples, the second set of slits are parallel to one another and perpendicular to the first set of slits 224 and the radiating element 204. In some examples, the first set of slits 224 and the second set of slits improve a transmission gain of the electromagnetic signals that the radiating element 204 transmits and/or receives. For example, the first set of slits 224 and the second set of slits can cause a constructive interference of electromagnetic fields inside the cavity formed by the metal housing 205 that enhances field propagation of the electromagnetic transmission signal into the throat section 107 of the vessel 105. In some disclosed examples, the electromagnetic signal enhanced by the constructive interference caused by the first set of slits 224 and the second set of slits allows for more accurate magnitude and phase measurements across larger vessel diameters.

In the illustrated example of FIG. 2, the pressure vessel apparatus 103 prevents fluid from entering the aperture antenna assembly 102 through the PRMW 212, which isolates the radiating element 204 from the fluid within the vessel 105. In some examples, the metal housing 205 and other components of the pressure vessel apparatus 103 provide support to the PRMW 212. The PRMW 212 provides a low-loss dielectric window for electromagnetic signals to propagate through as the electromagnetic signals transmit through the throat section 107 of the vessel 105 to and/or from the radiating element 204. In some examples, the PRMW 212 includes a high mechanical-strength ceramic material to improve a pressure-rating (e.g., 5000 psi or greater) and a temperature-rating (e.g., 150° C. or greater) of the PRMW 212. The example PRMW 212 includes a first face facing the interior of the throat section 107 of the vessel 105, a second face orthogonal to the first face extending away from the interior of the throat section 107 of the vessel 105, and a third face opposite the first face. In some disclosed examples, the first face of the PRMW 212 is flush (e.g., mesh) with an interior surface of the throat section 107 of the vessel 105. In some examples, the PRMW 212 includes flanges (e.g., tabs) extending from an edge of the second face farthest from the first face on opposite sides of the PRMW 212. In some such examples, an exterior surface of the vessel includes grooves that the flanges are to be aligned with to maintain an alignment of the first face of the PRMW 212. In some examples, the seal (e.g., an O-ring) 214 radially surrounds the second face of the PRMW 212, substantially orthogonal to the first face extending away from the vessel, to provide seal integrity during high-pressure flow. In some examples, the PRMW 212 is in contact with the electrical conductor shims 213 to ensure proper electrical shielding among the radiating element 204 by reducing (e.g., minimizing) cross-talk among the radiating elements 204. In some such examples, the electrical conductor shims 213 include copper, beryllium copper, bronze, and/or brass. Additionally, the electrical conductor shims 213 can include a gold-plating or a silver-plating on an exterior surface thereof.

In FIG. 2, the cavity filler 206A extends from the third face of the PRMW 212 opposite the first face. In some examples, the cavity filler 206A and the PRMW 212 are machined from a single piece of an appropriate dielectric material, such as an engineering thermoplastic (e.g., a polyether ether ketone (PEEK) material), for example. In some such examples, the cavity filler 206B can be machined from another piece of the same appropriate dielectric material. In some examples, the design of the PRMW 212 and the associated cavity filler 206A, 206B is based on the radiating element 204 design. For example, the cavity filler 206A can include slots based on the geometry of the radiating element 204. Further, in some examples, the cavity filler 206A, 206B is implemented to fill the cavity of the metal housing 205 on the opposite side of the radiating element 204 from the PRMW 212. In some such examples, the cavity filler 206A, 206B similarly includes PEEK material. The PEEK material provides high pressure retaining performance (e.g., design pressure of 100 to 200 bar) and wide temperature range (e.g., −29° C. to 121° C.). Additionally, the dielectric permittivity of the PEEK material within the PRMW 212 and the cavity filler 206A, 206B improves a transmission magnitude gain of the electromagnetic signal. Further, in some examples, the PRMW 212 and the cavity filler 206A, 206B include other ceramic materials with higher dielectric permittivity than PEEK, such as aluminum oxide, which substantially improves a transmission gain of the electromagnetic signal, in addition to improving the design pressure performance and temperature rating of the PRMW 212. In some examples, the cavity filler 206A, 206B includes a material with a higher dielectric permittivity than aluminum oxide, such as titanium dioxide, which substantially improves the transmission gain of the electromagnetic signal.

In the illustrated example of FIG. 2, the pressure vessel apparatus 103 further includes the metal housing 205, the elastic member 220, and the retaining member 222 to provide support to the PRMW 212 against fluid pressure within the vessel 105. In FIG. 2, the elastic member 220 is a washer. For example, the elastic member 220 can be a Belleville washer or any other type of washer. In FIG. 2 the retaining member 222 is a ring. For example, the retaining member 222 can be a Spirolox® retaining ring. In some examples, the elastic member 220 is preloaded to provide a resistance force by a bolt which is subsequently removed from the pressure vessel apparatus 103, as discussed in association with FIG. 8. In some such examples, the metal housing 205 includes internal threads for the bolt to couple to and preload the elastic member 220. Alternatively, in some examples, a body of the vessel 105 includes the internal threads for the bolt to couple to and preload the elastic member 220. In some such examples, the body of the vessel 105 includes a portion (e.g., an interior portion, a portion extending from an exterior surface to an interior point, etc.) of the vessel 105 that does not directly contact the fluid within the vessel.

In the illustrated example, the electrical conductor shims 213 are positioned at a secondary contact area between the pressure retaining measurement window (PRMW) 212 and the metal housing 205 to provide electrical shielding of the radiating element 204. In the illustrated example, a primary contact area between the PRMW 212 and the metal housing 205 is at a surface of the cavity filler 206A, 206B opposite the vessel 105. In some such examples, the electrical conductor shims 213 can include one or more layers at the secondary contact area based on the geometry of the PRMW 212 and the metal housing 205. Additionally, the electrical conductor shims 213 of the secondary contact area can provide a shielding connection between the metal housing 205 and the vessel 105. In other examples, separate ones of the electrical conductor shims 213 provide the separation between the flange of the PRMW 212 and the metal cavity housing 205 and the separation between the metal housing 205 and the vessel 105.

In the illustrated example, at the primary contact area between the PRMW 212 and the metal housing 205 an inside face (e.g., a front face) of the metal housing 205 is in contact with the cavity filler 206A, 206B and/or the PRMW 212 and an outside face (e.g., a back face) of the metal housing 205 is in contact with the elastic member 220. In the illustrated example, the retaining member 222 couples to a face of the elastic member 220 opposite the metal housing 205. In some examples, an exterior surface of the vessel 105 includes grooves for the retaining member 222 to be at least partially inserted within to align and maintain a relative position thereof. After the elastic member 220 of the pressure vessel apparatus 103 is preloaded, the retaining member 222 maintains a relative position of the elastic member 220 so that the elastic member 220 provides a force to the PRMW 212 to resist pressure within the vessel 105.

Figure 3:
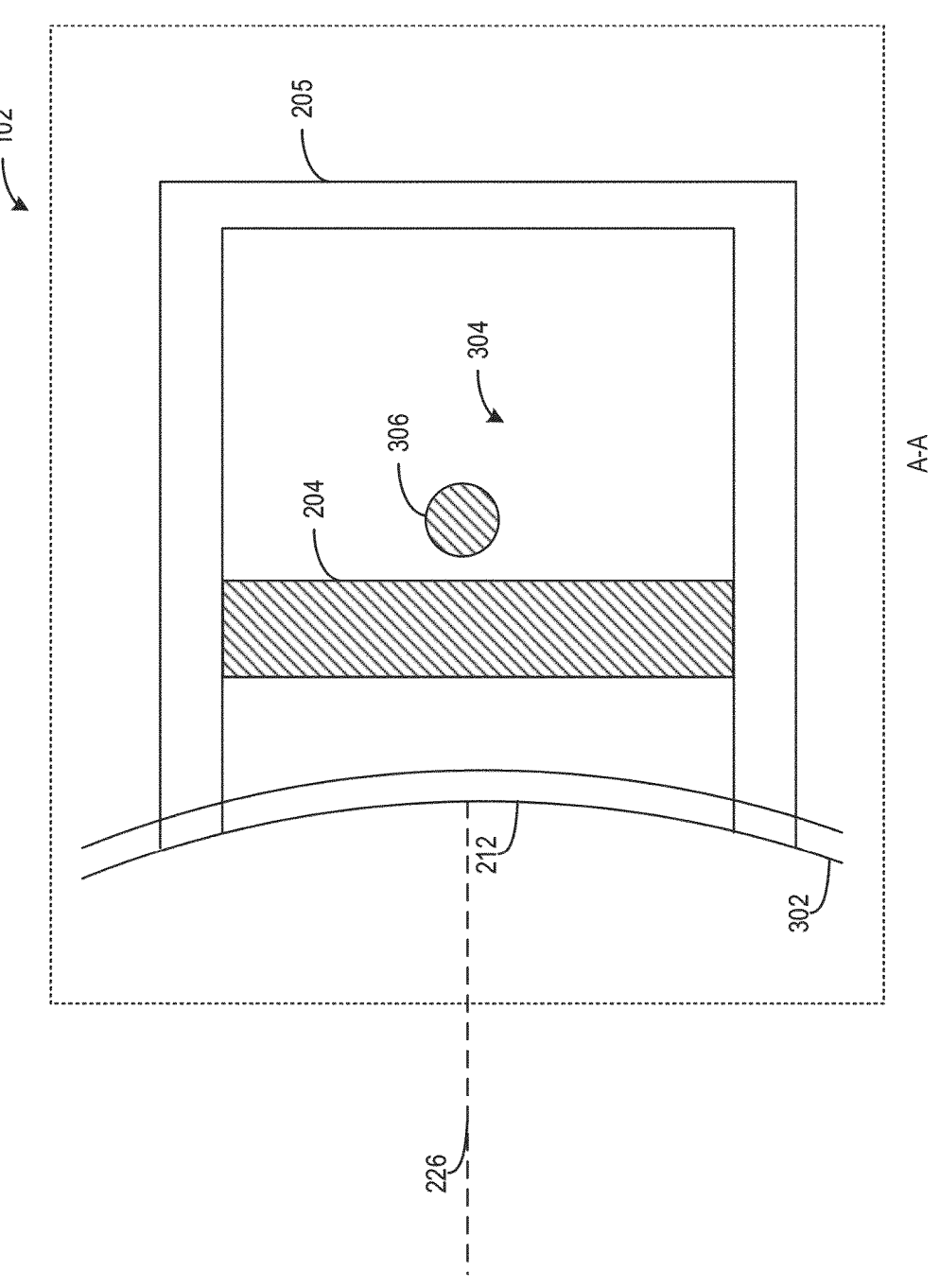
FIG. 3 illustrates an example cross-section of a simplified representation of the first example aperture antenna assembly of FIGS. 1 and/or 2.

FIG. 3 illustrates an example cross-section A-A of a simplified representation of the first aperture antenna assembly 102 of FIGS. 1 and/or 2. The simplified representation of the aperture antenna assembly 102 includes an example cavity filler 304 and a second example radiating element 306 in addition to the radiating element 204, the metal housing (e.g., the metal housing without any slits) 205, the pressure retaining measurement window (PRMW) 212, and the measurement plane 226 of FIG. 2. The simplified representation illustrates an example implementation of the aperture antenna of the aperture antenna assembly 102. In FIG. 3, the radiating element 204 is coupled to the metal housing 205 and the second radiating element 306 is positioned within the metal housing behind and orthogonally aligned with the radiating element 204. In the illustrated example, the radiating element 204 and the second radiating element 306 form a cross-dipole antenna. In some examples, the PRMW 212 functions as a dielectric window and a cavity-plug within an example interior surface 302 of the throat section 107 of the vessel 105 to provide a pressure barrier between the radiating element 204 and the flow within the vessel 105. In some examples, the thickness of the illustrated PRMW 212 is at least 2 mm, but in other examples, the thickness may be less than 2 mm. In the illustrated example, the cavity filler 304 at least partially extends from the PRMW 212 away from the throat section 107 of the vessel 105 and surrounds the radiating element 204 to provide insulation. For example, the cavity filler 304 of FIG. 3 can be an example implementation of at least one of the cavity filler 206A or the cavity filler 206B of FIG. 2. In the illustrated example, the radiating element 204 and the associated measurement plane 226 are substantially orthogonal to a direction of flow within the vessel 105. In some examples, the aperture antenna assembly 102 can include multiple radiating elements (e.g., 3 radiating elements, 4 radiating elements, etc.), such as radiating element 204, positioned around the periphery of a measurement plane, with e.g. two receivers at appropriate angular displacements with respect to two transmitters at the measurement plane, to perform drift-free magnitude and phase-shift measurements, as disclosed in the U.S. Pat. No. 8,536,883. Drift-free magnitude and phase-shift measurements may be performed at multiple (e.g. two) measurement planes, and/or across two measurement planes.

Figure 4A:
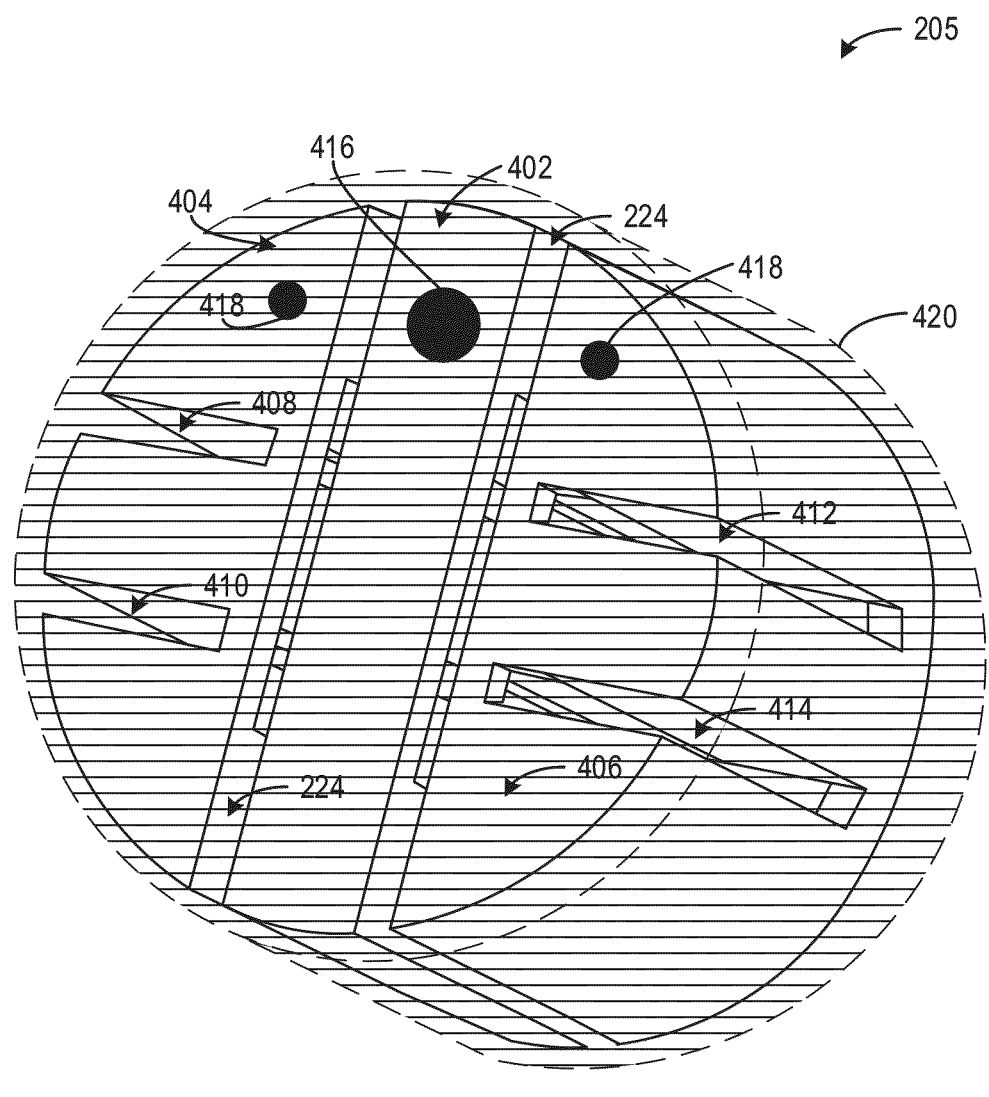
FIG. 4A illustrates a first example metal housing with cross-cut slits of the aperture antenna assembly of FIGS. 1, 2, and/or 3.

FIG. 4A illustrates a first example implementation of cross-cut slits in the metal housing 205 of the aperture antenna assembly 102 of FIGS. 1, 2, and/or 3. The first example metal housing 205 includes an example first section 404, an example second section (e.g., a middle section) 402, and an example third section 406. In the illustrated example, the second section 402 is separated from the first section 404 and the third section 406 by the parallel slits 224. In some examples, the second section 402 is coupled to the first section 404 and the third section 406 via a flange-mount and screws in association with the SMA connector 228, as further discussed in association with FIG. 5. In some such examples, the second section 402 and/or the metal housing 205 is supported by the cavity filler 304 inside the metal housing 205 and supported by a metal (e.g. copper tape with adhesive) shield 420 surrounding a circumference of the metal housing 205. In some examples, the metal shield 420 can be an example implementation of the conductor shield 208, discussed in association with FIG. 2. The second section 402 of the metal housing 205 includes an example opening 416 that the flange-mount of the SMA connector 228 aligns with so that the electrical RF cable 110 can extend through the metal housing 205 to couple to an end of the radiating element 204. In some examples, screws secure the flange-mount of the SMA connector 228 to the metal housing 205 by coupling to example threaded openings 418 of the first section 404 and the third section 406.

In the illustrated example, the second section 402 of metal housing 205 and, thus, the radiating element 204 can be removed by uncoupling the screws from the metal housing 205. The removability of the second section 402 of the metal housing 205 allows for easy repairs or replacement of the radiating element 204 and associated SMA connector 228 connected to the electrical RF cable 110. Additionally, the removability of the second section 402 allows for the pressure retaining performance of the pressure vessel apparatus 103 to be tested without the radiating element 204 installed and, thus, reduces the risk of damaging the radiating element 204 due to poor pressure retaining performance.

In FIG. 4A, the parallel slits 224 are parallel (e.g., substantially parallel) to the radiating element 204, as discussed in association with FIG. 2. As used herein in the context of describing the position and/or orientation of a first object relative to a second object, the term "substantially parallel" encompasses the term parallel and more broadly encompasses a meaning whereby the first object is positioned and/or oriented relative to the second object at an absolute angle of no more than two degrees (2°) from parallel. For example, a first axis that is substantially parallel to a second axis is positioned and/or oriented relative to the second axis at an absolute angle of no more than two degrees (2°) from parallel.

In some examples, the parallel slits 224 include a width in an example range of 0.5 and 2.0 mm with the 2.0 mm maximum width determined by the diameter of the radiating element 204. In some such examples, a larger slit width results in a better transmission gain of the electromagnetic signal. In the illustrated example, the first section 404 includes an example first slit 408 and an example second slit 410 that extend partially through the first section 404. Additionally, the third section 406 includes an example third slit 412 and an example fourth slit 414 that extend partially through the third section 406. The first slit 408, the second slit 410, the third slit 412, and the fourth slit 414 form a set of perpendicular slits 408, 410, 412, 414 that are substantially perpendicular, substantially orthogonal, etc., to the parallel slits 224 and, thus, to the radiating element 204. In some examples, the perpendicular slits 408, 410, 412, 414 include a width between 0.5 and 2.0 mm with the 2.0 mm maximum width determined by the diameter of the radiating element 204. In some such examples, a larger slit width results in a better transmission gain of the electromagnetic signal. The parallel slits 224 and/or the perpendicular slits 408, 410, 412, 414 are configured to enhance a field propagation of the electromagnetic signal into the throat section

107 of the vessel 105 via constructive interference inside the cavity formed by the metal housing 205. Specifically, the perpendicular slits 408, 410, 412, 414 produce complimentary electromagnetic fields that are in the same direction as the transmitted electromagnetic field.

As used herein in the context of describing the position and/or orientation of a first object relative to a second object, the term "substantially perpendicular" encompasses the term perpendicular and more broadly encompasses a meaning whereby the first object is positioned and/or oriented relative to the second object at an absolute angle of no more than two degrees (2°) from perpendicular. For example, a first axis that is substantially perpendicular to a second axis is positioned and/or oriented relative to the second axis at an absolute angle of no more than two degrees (2°) from perpendicular.

Figure 4B:
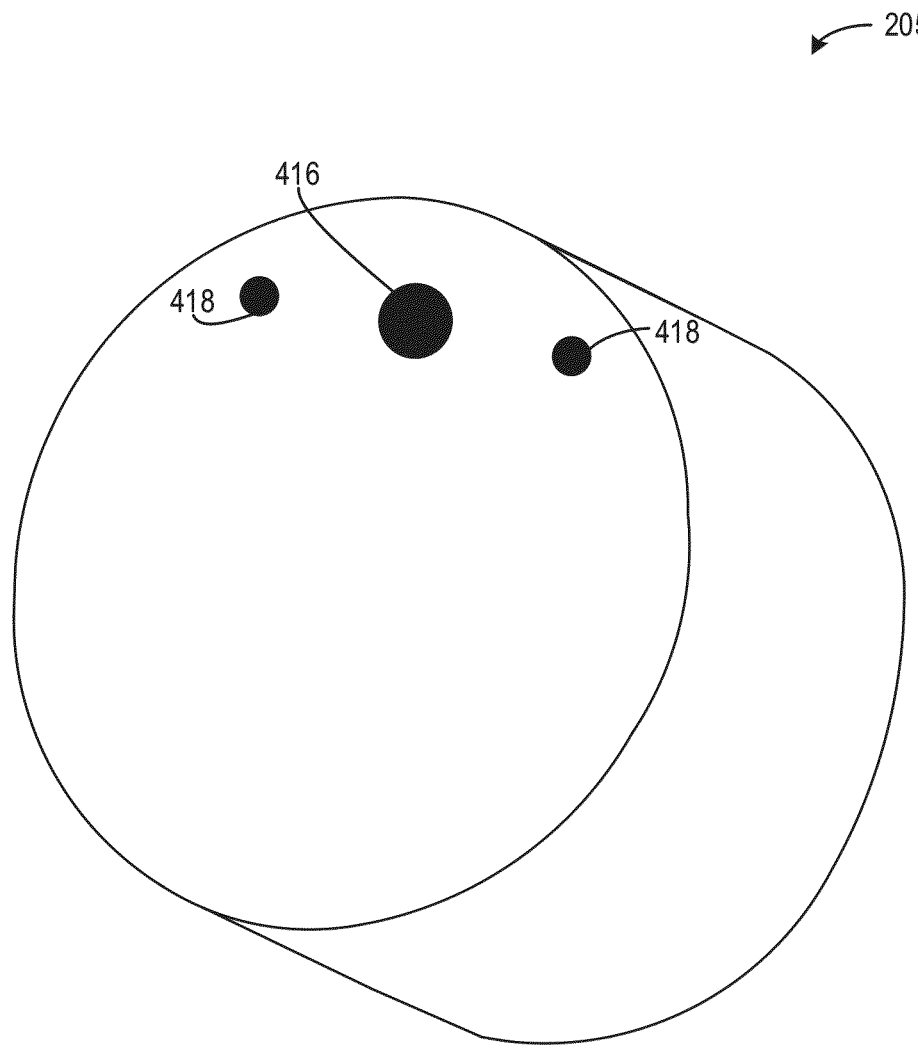
FIG. 4B illustrates a second example metal housing without slits of the aperture antenna assembly of FIGS. 1, 2, and/or 3.

FIG. 4B illustrates a second example metal housing 205 without slits on the aperture antenna assembly 102 of FIGS. 1, 2, and/or 3. In the illustrated example, the metal housing 205 includes the opening 416 that the flange-mount of the SMA connector 228 aligns with so that the electrical RF cable 110 can extend through the metal housing 205 to the radiating element 204. Additionally, the metal housing 205 includes the threaded openings 418 to allow screws to couple the flange-mount of the SMA connector 228 to the metal housing 205.

Figure 5:
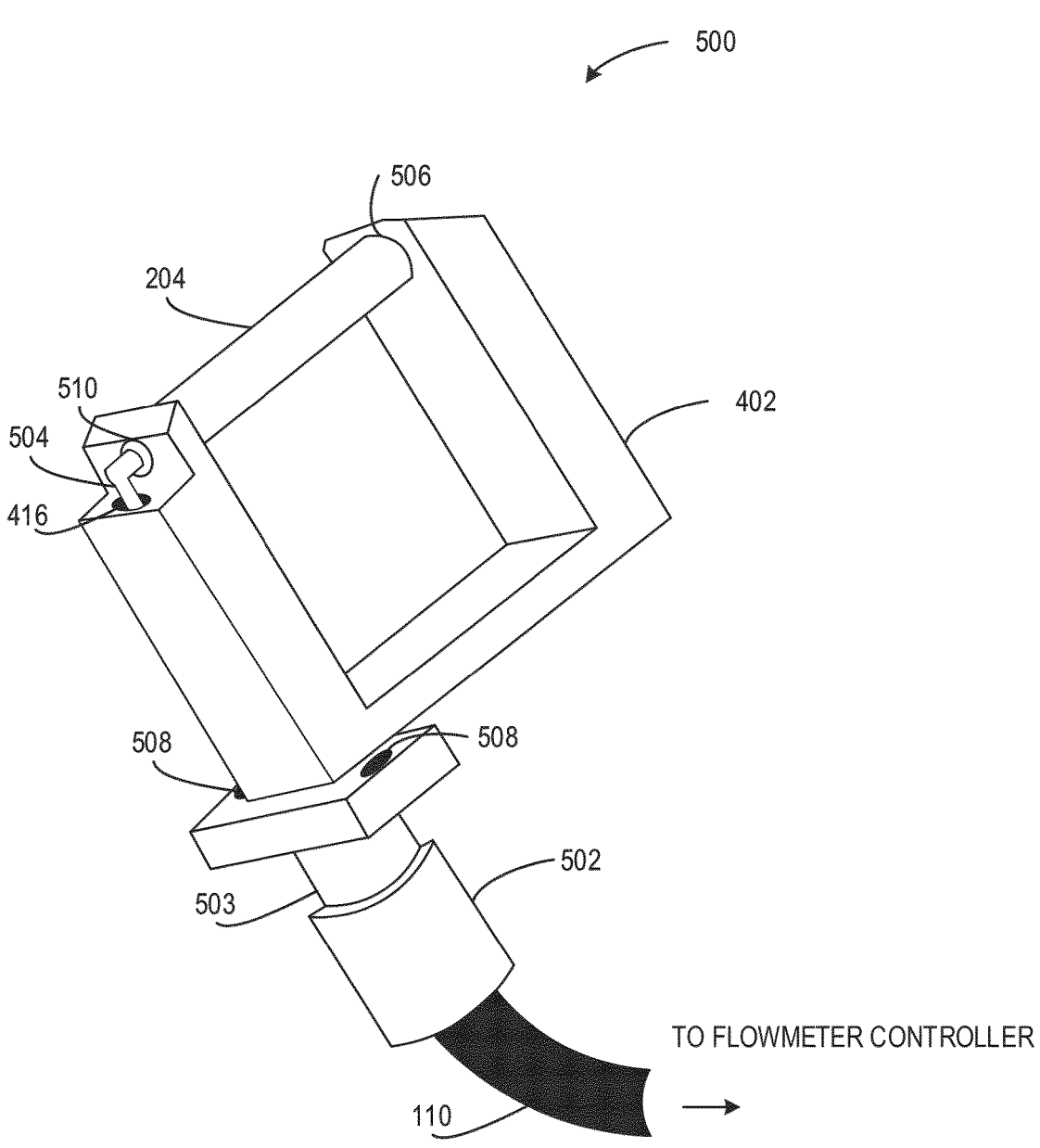
FIG. 5 illustrates an example midsection of the second example metal housing with cross-cut slits of FIG. 4B.

FIG. 5 illustrates an example midsection (e.g., a middle section) 500 of the second example metal housing 205 of FIG. 4B. For example, the midsection 500 of FIG. 5 can correspond to the second section 402 of FIG. 4B. The midsection 500 of the metal housing 205 includes the electrical RF cable 110 coupled to an example ('Male') SMA connector 502, an example flange-mount ('female') SMA connector (e.g., an SMA connector and associated coaxial feedthrough) 503 including example threaded holes 508 for screws to couple the flange-mount SMA connector 503 to the first section 404 and the third section 406 of the metal housing 205. For example, the flange-mount SMA connector 503 can correspond to the SMA connector 228 of FIGS. 1 and/or 2. The second section 402 of the metal housing 205 further includes the opening 416 to allow the coaxial feedthrough of the SMA connector 503 to couple to the radiating element 204. In the illustrated example, a solder or interference-fit connection 504 couples an end of the coaxial-feedthrough of the SMA connector 503 to a first end of the radiating element 204. In the illustrated example, the second section 402 includes an insulation ring 510 to insulate the connection between a center-conductor of the SMA connector 503 and the radiating element 204 from the metal housing 205. In some such examples, the metal housing 205, or second section 402 thereof, is electrically connected to an outer-conductor of the SMA connectors 502, 503. In some examples, a second end 506 of the radiating element 204 couples to the second section 402 of the metal housing 205, via the interference fit. In the illustrated example, the electrical RF cable 110, coupled with SMA connectors 502, 503 transports electromagnetic signals between the flowmeter controller 104 and the radiating element 204. In some examples, the radiating element 204 includes a gold plating on the exterior surface thereof to prevent oxidation.

Figure 6:
FIG. 6 illustrates a simplified cross-section of an example pressure vessel apparatus of the aperture antenna assembly of FIGS. 1 and/or 2.

FIG. 6 illustrates a simplified cross-section A-A of the pressure vessel apparatus 103 of the aperture antenna assembly of FIGS. 1 and/or 2. The pressure vessel apparatus 103 of FIG. 6 includes the metal housing 205, the PRMW 212, the seal 214, the elastic member 220, the retaining member 222, and the measurement plane 226 of FIG. 2. Advantageously, the pressure vessel apparatus 103 provides a relatively compact, low-cost solution to replace the generic bolt-flange assembly that supports the PRMW 212 from displacement. The pressure vessel apparatus 103 can reduce passive interference or cross-talk of the electromagnetic signals that can be caused by the bolt-flange assembly as components deteriorate (e.g., rust).

In the illustrated example, a first face 610 of the PRMW 212 meshes with the interior surface 302 of the throat section 107 of the vessel 105. In some examples, a second face 612 of the PRMW 212 extends away from the interior surface 302 of the throat section 107 of the vessel 105 and is substantially orthogonal to the first face 610 of the PRMW 212. In FIG. 6, the seal 214 is an O-ring that radially surrounds the second face 612 of the PRMW 212. The seal 214 provides seal integrity to the PRMW 212 when there is high pressure flow within the vessel 105. In the illustrated example, the metal housing 205 is in contact with a third face 614 of the PRMW 212 and the conductor shield 208 is in contact with an opposite side of the metal housing 205. In some examples, the metal housing 205 and conductor shield 208 are the same structure. The elastic member 220 is in contact with an example face 615 of the conductor shield 208 and/or the metal housing 205 opposite the PRMW 212. The elastic member 220 is preloaded to support the PRMW 212 against the pressure exerted by the fluid within the vessel 105. The retaining member 222 is in contact with an example face 616 of the elastic member 220 opposite the PRMW 212 to retain the relative position of the elastic member 220 and the pressure vessel apparatus 103.

The design of the pressure vessel apparatus 103 considers a compressed configuration of the elastic member 220 that supports the PRMW 212 against pressure and prevents axial displacement. In the example of Equation (1) below, the preload, $F_P$, of the elastic member 220 is calculated to be higher than the pressure, P, that the fluid within the vessel 105 exerts based on the dimensions of the seal 214, $$\frac{\pi d_S^2}{4}.$$

Further, Equation (1) below considers the loss of preload due to contacts embedment, $F_Z$, and thermal effects, $F_T$. The contacts embedment, $F_Z$, and thermal effects, $F_T$, considers the stiffness of the retaining member 222, $K_{RD}$, the metal housing 205 and/or conductor shield 208, $K_{SP}$, and the elastic member 220, $K_{EC}$. The contacts embedment, $F_Z$, also considers the contact surface embedment between the retaining member 222 and the elastic member 220, $f_{z1}$, between the elastic member 220 and the metal housing 205 and/or conductor shield 208, $f_{z2}$, and between the metal housing 205 and/or conductor shield 208 and the third face 614 of the PRMW 212, $f_{z3}$. The thermal effects, $F_T$, includes a maximum temperature difference between pressure vessel apparatus 103 temperature and an operation temperature, $\Delta T$. Additionally, the thermal effects, $F_T$, considers an average coefficient of thermal expansion of the retaining member 222, $\alpha_{RD}$, the metal housing 205 and/or conductor shield 208, $\alpha_{SP}$, and the elastic member 220, $\alpha_{EC}$, in addition to a distance between the retaining member 222 and the first face 610 of the PRMW 212, $l_k$.

$$F_P = P\frac{\pi d_S^2}{4} + F_Z(K_{RD}, K_{SP}, K_{EC}, f_{z1}, f_{z2}, f_{z3}) + \qquad \text{Equation (1)}$$
$$F_T(K_{RD}, K_{SP}, K_{EC}, \Delta T, \alpha_{RD}, \alpha_{SP}, \alpha_{EC}, l_k)$$

In some examples, the flowmeter controller 104 uses Equation (1) to determine a material and/or geometry of the retaining member 222, the elastic member 220, the metal housing 205, and/or the conductor shield 208 that provides the elastic member 220 with the preload, $F_P$. In some examples, an operator (e.g., a machine, a machine operator, etc.) can perform numerical analysis to validate the sufficiency of the preload, $F_P$, that the elastic member 220 exerts. The preload, $F_P$, of the elastic member 220 can be increased by incorporating a second elastic member in series with the elastic member 220 and the retaining member 222. Additionally, the retaining member 222 is designed to withstand the preload, $F_P$, to prevent displacement of the PRMW 212 against pressure in the vessel 105.

In some examples, the elastic member 220 is a Belleville washer that provides a large preload $F_P$, from a small compression to allow for a compact design of the pressure vessel apparatus 103. Additionally, in some examples, the retaining member 222 is a Spirolox® retaining ring that includes a high strength to size ratio to further allow for a compact design of the pressure vessel apparatus 103.

Figure 7:
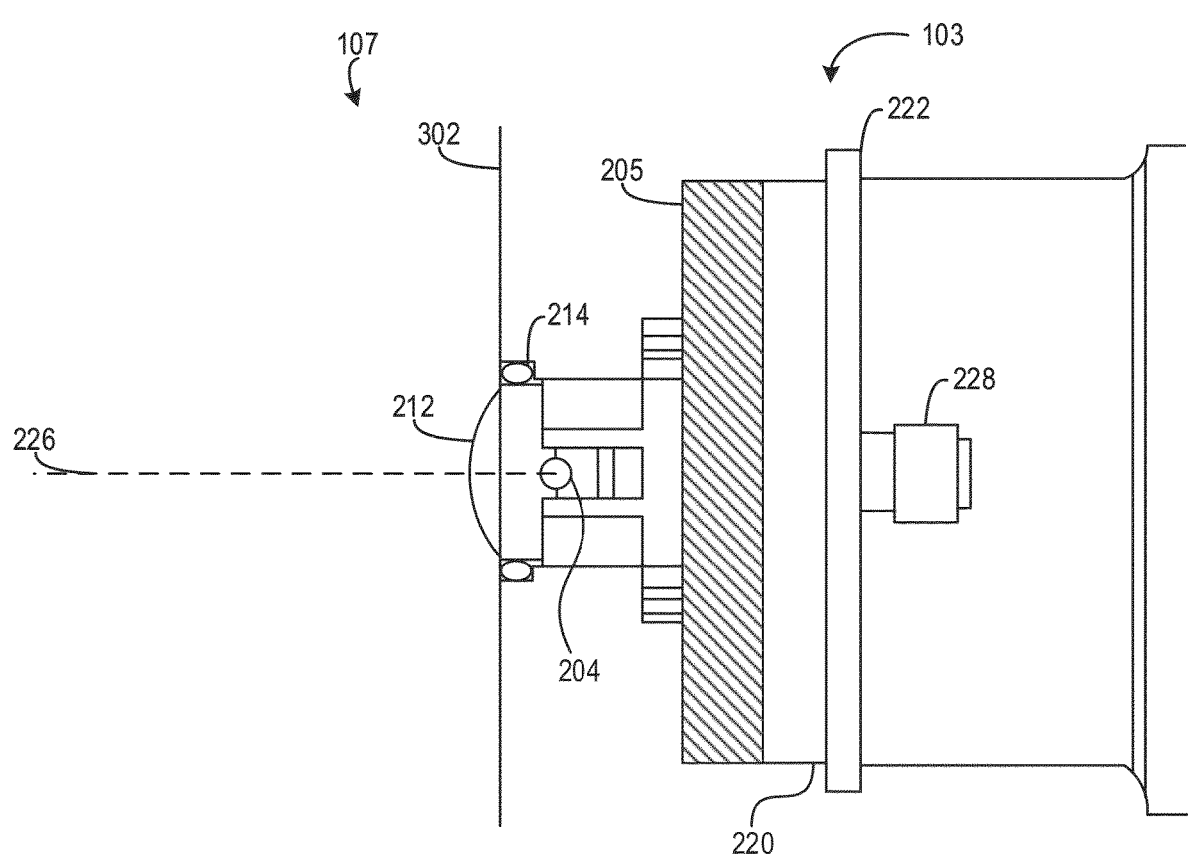
FIG. 7 illustrates a second example pressure vessel apparatus of the aperture antenna assembly implemented on the edge of a vessel of FIGS. 1 and/or 2.

FIG. 7 illustrates a second example implementation of the pressure vessel apparatus 103 of the aperture antenna assembly 102 implemented on the edge of the vessel 105 of FIGS. 1 and/or 2. The example pressure vessel apparatus 103 includes the PRMW 212, the seal 214, the metal housing 205, the elastic member 220, and the retaining member 222 of FIG. 2. The pressure vessel apparatus 103 of FIG. 7 includes the radiating element 204 of FIG. 2 to transmit and/or receive electromagnetic signals across the measurement plane 226 of FIG. 2.

In FIG. 7, the PRMW 212 has a curvature that matches with the interior surface 302 of the throat section 107 of the vessel 105. The seal 214 radially surrounds the PRMW to create a sufficient seal against the fluid pressure within the throat section 107 of the vessel 105. In the illustrated example, the metal housing 205 contacts a face of the cavity filler extending from a face of the PRMW 212 opposite the throat section 107 of the vessel 105. In FIG. 7, the elastic member 220 is compressed to provide a preload to the metal housing 205 and, thus, the PRMW 212 to resist the fluid pressure within the throat section 107 of the vessel 105. In some examples, the flowmeter 100 includes a groove (e.g., a slot, a rim, etc.) to install the retaining member 222 and maintain a relative position thereof. In the illustrated example, the retaining member 222 supports the preload of the elastic member 220 so that the retaining force is directed towards the metal housing 205 and the PRMW 212 to counteract the pressure within the throat section 107 of the vessel 105 and prevent displacement of the PRMW 212.

Figure 8A:
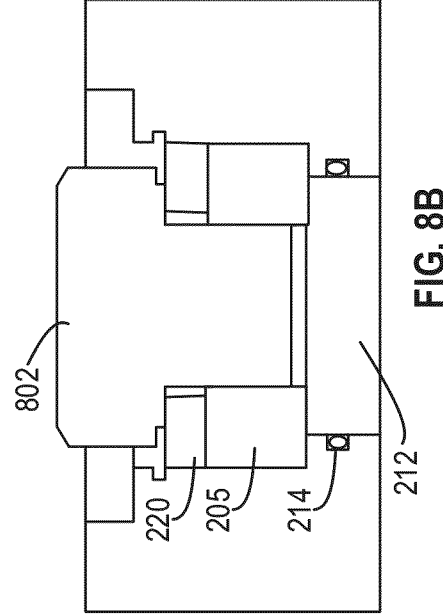
FIGS. 8A-8D illustrate an example process to preload an example pressure vessel apparatus.

FIGS. 8A-8D illustrate an example process or workflow to preload the pressure vessel apparatus 103 of FIG. 1. The illustrated example includes an example bolt 802, the elastic member (e.g., a washer, a Belleville washer, etc.) 220, the retaining member (e.g., a retaining ring, a Spirolox® retaining ring, etc.) 222, the metal housing 205, the seal (e.g., an O-ring) 214, and the PRMW 212. In FIG. 8A, an operator (e.g., a machine, a machine operator, etc.) screws the bolt 802 into an opening of the metal housing 205 with the elastic member 220 radially surrounding a body of the bolt 802 above the metal housing 205.

Figure 8B:
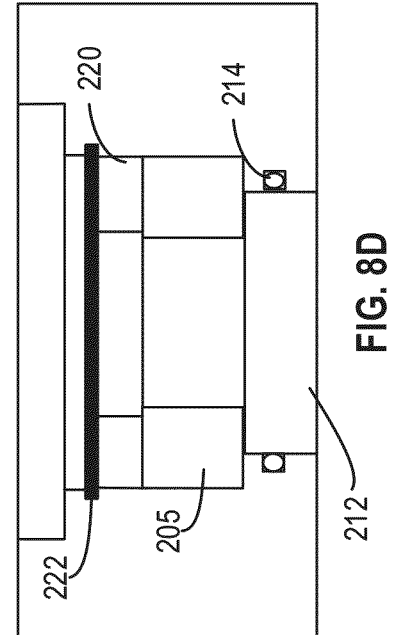

In FIG. 8B, an operator (e.g., a machine, a machine operator, etc.) torques the bolt 802 to compress (e.g., flatten)

the elastic member 220 between the bolt 802 and the metal housing 205, thereby preloading the elastic member 220.

Figure 8C:
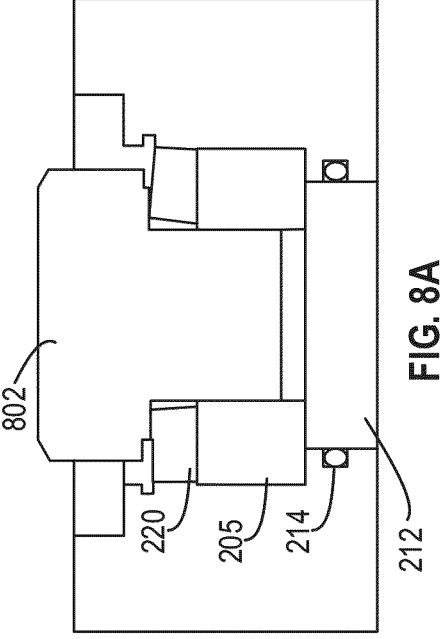

In FIG. 8C, an operator (e.g., a machine, a machine operator, etc.) installs the retaining member 222 into a groove of the flowmeter 100 of FIG. 1. In the illustrated example, an inner diameter of the retaining member 222 is larger than the diameter of a head of the bolt 802 so that the user can install the retaining member 222 over the head of the bolt 802. In the illustrated example, the inner diameter of the retaining member 222 is smaller than an outer diameter of the elastic member 220 so that the retaining member 222 remains in contact with, and retains a position of, the elastic member 220 after the bolt 802 applies the preload.

Figure 8D:
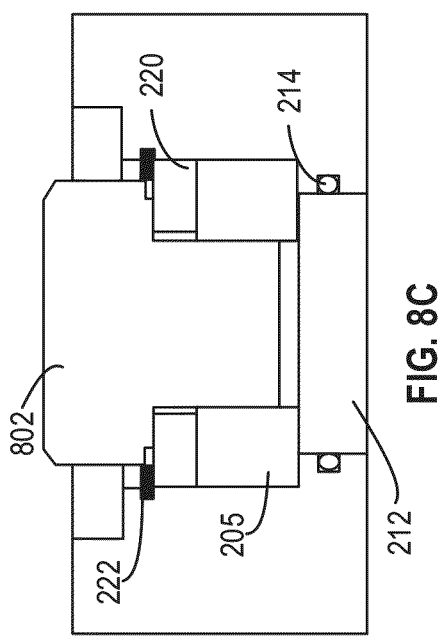

In FIG. 8D, an operator (e.g., a machine, a machine operator, etc.) removes (e.g., unscrews) the bolt 802 from the opening in the metal housing 205. The retaining member 222 retains the preload of the elastic member 220 applied by the bolt 802 and, as a result, the pressure vessel apparatus 103 is preloaded to support the PRMW 212 against fluid pressure within the vessel 105 and prevent axial displacement thereof. In some examples, the bolt 802 is utilized to preload more than one pressure vessel apparatus 103.

FIG. 9 illustrates an example implementation of the pressure retaining measurement window 212 of FIG. 2 that can be included in the pressure vessel apparatus 103 of FIGS. 1, 2, 6, 7, and/or 8. In the illustrated example, the PRMW 212 includes an example outer face 902, an example shoulder 904, an example inner face 906, two example flanges (e.g., tabs) 908 on opposite sides of the PRMW 212, an example cavity filler 910, an example primary contact surface 912, and an example secondary contact surface 914. The PRMW 212 includes a low-loss dielectric material and/or a substantially high dielectric constant (ε) material (e.g., ε=3, ε=9, etc.), such as an engineering thermoplastic PEEK, or an aluminum oxide ceramic, for example, to facilitate the transmission and reception of electromagnetic signals by a radiating element 204.

In the illustrated example, the outer face 902 has a curvature that substantially matches (e.g., matches within a tolerance in a range of 0-1%) a curvature of an interior surface 302 of the throat section 107 of the vessel 105 of FIG. 1. The thickness between the outer face 902 and the inner face 906 is at least 2 mm. Alternatively, the thickness may be any other value depending on the design pressure and temperature. In some examples, the shoulder 904 is substantially orthogonal to the outer face 902 and the interior surface 302 of the throat section 107 of the vessel 105. In some such examples, the seal (e.g., an O-ring) 214 surrounds the shoulder 904 to provide seal integrity to the PRMW 212 during high pressure applications. In some disclosed examples, a geometry of the inner face 906 typically depends on a geometry of the metal housing 205 including the radiating element 204 that will be implemented within a cavity between the metal housing 205 and the inner face 906.

In the illustrated example, the cavity filler 910 can be an example implementation of the cavity filler 206A of FIG. 2, and/or the cavity filler 304 of FIG. 3. In FIGS. 9, the cavity filler 910 extends from the inner face 906 of the PRMW 212. In some examples, the cavity filler 910 is a cylinder that includes slots within which the radiating element 204 is to be positioned. In the illustrated example, the cavity filler (e.g., cavity filler 206A, cavity filler 304) 910 includes a single slot within which the radiating element 204 is to be implemented. In other words, the cavity filler 910 includes two half-circle pillars that extend from the inner face 906 of the PRMW 212. In FIG. 9, the face of the cavity filler 910 opposite the outer face 902 of the PRMW 212 is the primary contact surface 912 that contacts a cavity bottom surface of the metal housing 205 directly. In some examples, the secondary contact surface 914 is in contact with the metal housing 205, and/or the electrical conductor shim 213 to provide electrical shielding among the radiating elements 204.

In FIG. 9, the primary contact surface 912 for the pressure vessel apparatus 103 is the face of the cavity filler 910 opposite the outer face 902. In some examples, a face of the cavity filler 206A, 206B forms the primary contact surface 912 that contacts the metal housing 205 of FIG. 2. In the illustrated example, a face of the flanges 908 opposite the outer face 902 forms the secondary contact surface 914. In some examples, the secondary contact surface 914 is in contact with a flange shoulder of the metal housing 205 and/or the electrical conductor shim 213 to provide electrical shielding for the electromagnetic signals transmitted and/or received by the radiating element 204. In some examples, the flowmeter 100 includes grooves in an exterior surface of the vessel 105 for the flanges 908 to be positioned within. The flanges 908 maintain the alignment of the curvature of the outer face 902 with the interior face 302 of the throat section 107 of the vessel 105.

FIG. 10 is a block diagram 1000 of an example implementation of a multiphase flow meter including a plurality of antenna aperture assemblies 102A, 102B coupled to the vessel 105 of FIGS. 1 and/or 2. The illustrated example includes the measurement plane 226, a transmission radiating element 204A (of a first aperture antenna assembly 102A), a receiving radiating element 204B (of a second aperture antenna assembly 102B), and the pressure vessel apparatus 103A, 103B of the respective aperture antenna assemblies 102A, 102B including the measurement windows (e.g., PRMWs) 212A, 212B, the cavity fillers 304A, 304B, the seals 214A, 214B, the metal housings (e.g., metal cavity housings) 205A, 205B, the conductor shields 208A, 208B, the elastic members 220A, 220B, and the retaining members 222A, 222B of FIG. 2. The aperture antenna assemblies 102A, respectively 102B, further includes the electrical RF cables with associated RF connectors 110A, respectively 110B. Each aperture antenna assembly 102A, 102B may further comprise a flowmeter transmitter 108, a process control system 116, a computing device(s) 114, and a flowmeter controller 104 including the microwave electronics 106 of FIGS. 1 and/or 2. Alternatively, all or part of the elements 104-116 may not be included in the aperture antenna assemblies. Furthermore, all or part of the elements 104-116 may be connected to both aperture antenna assemblies 102A, 102B and configured to operate, communicate and/or interact with both of the aperture antenna assemblies as explained below.

In FIG. 10, the microwave electronics 106 generate an electromagnetic signal and transmit the electromagnetic signal to the transmission radiating element 204A via the electrical RF cable 110A. The transmission radiating element 204A transmits the electromagnetic signal through the PRMW 212A across the measurement plane 226. In some examples, the transmission radiating element 204A receives a reflection of the electromagnetic signal after the electromagnetic signal reflects off a fluid in the throat section 107 of the vessel 105 near the PRMW 212A. The receiving radiating element 204B receives the transmission of the electromagnetic signal across the throat section 107 of the vessel 105 after the electromagnetic signal travels through the associated PRMW 212B.

In FIG. 10, the radiating elements 204A, 204B communicate the received electromagnetic signals to the flowmeter controller 104. The flowmeter controller 104 utilizes the microwave electronics 106 to determine magnitude and phase data of the transmitted and reflected electromagnetic signals. In some examples, the flowmeter controller 104 and/or the microwave electronics 106 determine fluid parameters such as a water-liquid ratio (WLR) and/or a gas holdup (GHU) based on the magnitude and phase data. In some examples, the flowmeter controller 104 may transmit the determined fluid parameters, such as WLR and/or GHU data, for example, to the flowmeter transmitter 108. Additionally, the flowmeter transmitter 108 can receive a pressure, a differential pressure, a temperature of the fluid within the vessel 105, measured respectively by a pressure sensor, a differential-pressure sensor, a temperature sensor (not shown). In some examples, the flowmeter transmitter 108 may transmit the measured pressure, differential pressure, and the temperature of the fluid within the vessel 105 to the flowmeter controller 104.

In some examples, the flowmeter controller 104 communicates, via the communication network channel (e.g., the Internet) 112 as shown in FIG. 1, the magnitude and phase data, the determined fluid parameters (WLR and/or GHU), and/or the measured pressure, differential pressure, and the temperature of the fluid within the vessel 105 to the computing device(s) 114. In some examples, the computing device(s) 114 determine additional fluid parameters such as an oil flow rate, a gas flow rate, a water flow rate, a salinity, permittivity, and/or conductivity of the fluid within the vessel 105 and communicate the additional fluid parameters to the flowmeter controller 104. Further, the flowmeter controller 104, the computing device(s) 114, and/or the flowmeter transmitter 108 communicate determined fluid parameters to the process control system 116. In some examples, the flowmeter controller 104 generates a report including the determined fluid parameters and transmits the report to a database and/or the process control system 116. In some disclosed examples, the flowmeter controller 104 determines if the aperture antenna assembly 102 should adjust fluid property parameters based on the measured pressure, temperature, and/or salinity, and/or adjust a radio frequency of the electromagnetic signal based on the determined fluid parameters, such as the WLR and/or the GHU. In some examples, the process control system 116 adjusts fluid parameters based on the determined fluid parameters. For examples, the process control system 116 can adjust a choke valve at the surface to increase or decrease line pressure and/or a flow rate within the vessel 105.

In the illustrated example of FIG. 10, the pressure vessel apparatus 103A, 103B prevents fluid from entering the aperture antenna assembly 102 and, thus, protects the associated radiating element 204A, 204B. In some disclosed examples, to prevent fluid from entering the aperture antenna assembly, without obstructing flow within the vessel 105, the PRMW 212A, 212B is positioned between the fluid and the radiating element 204A, 204B and meshes with an interior surface 302 of the throat section 107 of the vessel 105. In some examples, the seal 214A, 214B radially surrounds the associated PRMW 212A, 212B to ensure seal integrity when high pressures within the vessel 105 are encountered. In some examples, the cavity filler 304A, 304B extends from the PRMW 212A, 212B away from the throat section 107 of the vessel 105. In some examples, the cavity filler 304A, 304B includes slots to fit the radiating element 204A, 204B within the cavity filler 304A, 304B.

In the illustrated example, the elastic member 220A, 220B preloads the associated PRMW 212A, 212B to withstand the pressure exerted by the flow of the fluid within the vessel 105. Specifically, the elastic member 220A, 220B is compressed to provide the preload and a retaining member 222A, 222B withstands the preload exerted by the elastic member 220A, 220B to retain a relative position thereof. In some such examples, the elastic member 220A, 220B transfers the preload to the PRMW 212A, 212B through the conductor shield 208A, 208B and/or the metal housing 205A, 205B which contacts the cavity filler 304A, 304B of the PRMW 212A, 212B.

In the illustrated example of FIG. 10, the metal housing 205A, 205B couples to an end of the associated radiating element 204A, 204B. Advantageously, the metal housing 205A, 205B includes slits to cause a constructive interference of the electromagnetic fields in the cavity of the metal housing including the high-permittivity cavity filler 304A, 304B, which allows the electromagnetic signals to attain higher transmission gain to have relative good-quality magnitude and phase measurements over a higher salinity range, and/or across a larger diameter throat section 107 of the vessel 105. In some such examples, the relative good-quality magnitude and phase measurements result from less amplitude attenuation of the electromagnetic signals and provide operators with more precise and accurate measurements than a flowmeter 100 using a low-permittivity cavity filler. In FIG. 10, the conductor shield 208A, 208B surrounds the metal housing 205A, 205B to provide electromagnetic shielding for the electromagnetic signals within the metal housing 205A, 205B.

Figure 11:
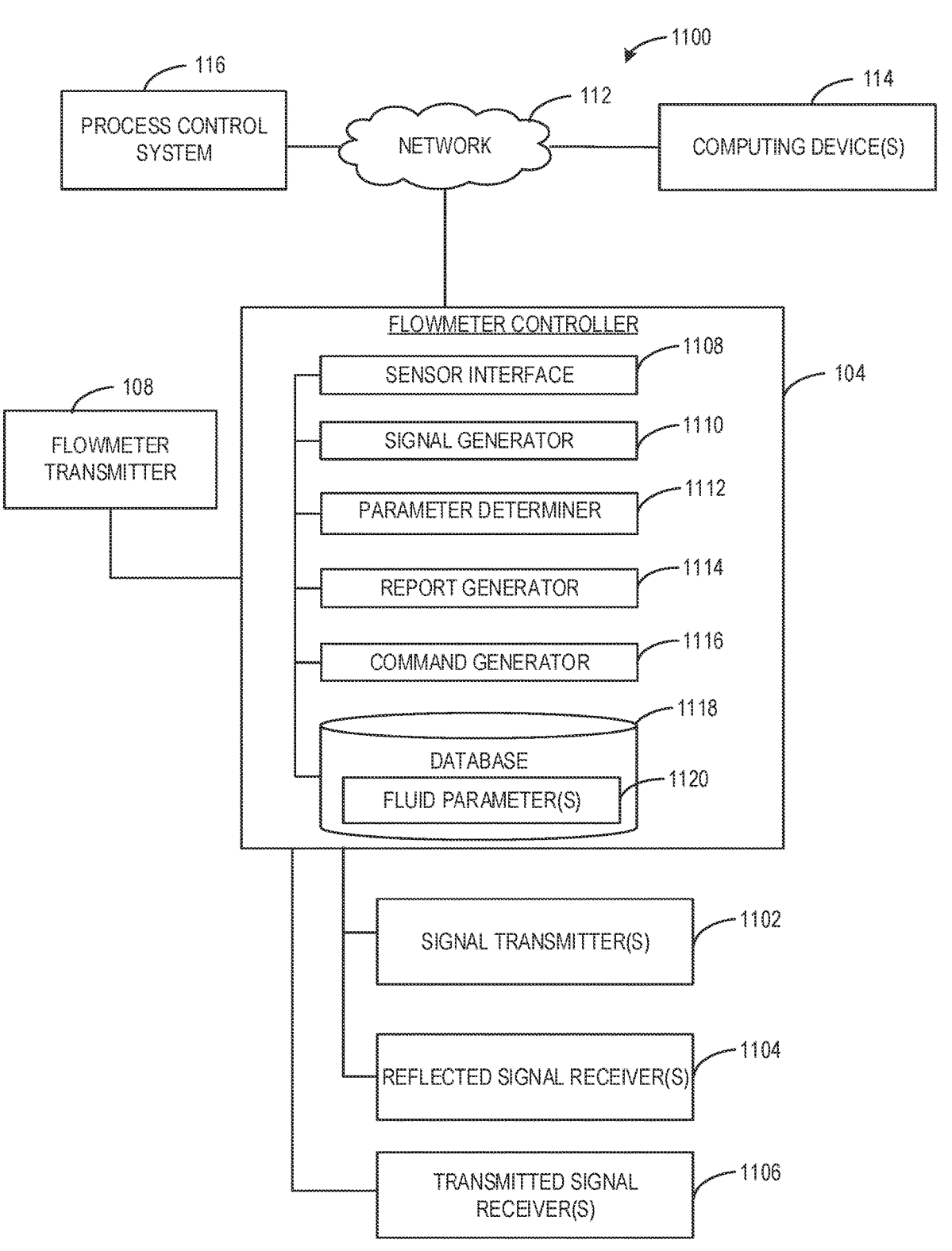
FIG. 11 is a block diagram of an example flowmeter controller associated with the example aperture antenna assembly of FIGS. 1 and/or 2.

FIG. 11 is a block diagram of an example multiphase flowmeter system 1100 including the flowmeter controller 104 of FIG. 1 associated with the multiphase flowmeter 100 of FIG. 1. The multiphase flowmeter system 1100 includes the flowmeter transmitter 108, the flowmeter controller 104, the network 112, the computing device(s) 114, the process control system 116, example signal transmitter(s) (e.g., radiating element 204A) 1102, example reflected signal receivers (e.g., radiating element 204A) 1104, and example transmitted signal receiver(s) (e.g., radiating element 204B) 1106. The example implementation of the flowmeter controller 104 depicted in FIG. 11 includes an example sensor interface 1108, an example signal generator 1110, an example parameter determiner 1112, an example report generator 1114, an example command generator 1116, and an example database 1118 including example fluid parameter(s) 1120.

In the illustrated example of FIG. 11, the signal generator 1110 can be an example implementation of the microwave sensor electronics 106 of FIG. 1. The signal generator 1110 can generate an electromagnetic signal and transmit the electromagnetic signal to the signal transmitter(s) 1102 via the electrical RF cables with associated RF connectors 110 of FIG. 1. In some examples, the signal transmitter(s) 1102 transmit(s) the electromagnetic signal into the throat section 107 of the vessel 105. In some such examples, the electromagnetic signal is received by the reflected signal receiver(s) 1104 and the transmitted signal receiver(s) 1106. The reflected signal receiver(s) 1104 and the transmitted signal receiver(s) 1106 communicate the received electromagnetic signals to the sensor interface 1108 of the flowmeter controller 104.

In FIG. 11, the sensor interface 1108 transmits the electromagnetic signals to the parameter determiner 1112. In the illustrated example, the parameter determiner 1112 can be an example implementation of the microwave sensor electronics 106. In some examples, the parameter determiner 1112 determines magnitude and phase data of the electromagnetic signals. In some examples, the parameter determiner 1112 utilizes the determined magnitude and phase data of the electromagnetic signals to determine a water-liquid ratio (WLR) and/or a phase-fraction (e.g. gas holdup GHU) of a fluid within the vessel 105. Further, in some examples, the flowmeter transmitter 108 determines additional fluid parameters such as a flow pressure, a temperature, and/or a differential pressure of the fluid within the vessel 105 and communicates the fluid parameters to the flowmeter controller 104.

In FIG. 11, the flowmeter controller 104 transmits the fluid parameters determined by the parameter determiner 1112 and the flowmeter transmitter 108 to the network 112. In some examples, the network 112 communicates the determined fluid parameters to the computing device(s) 114. In some such examples, the computing device(s) 114 includes functions (e.g., algorithms, equations, etc.) that utilize the parameters determined by the flowmeter transmitter 108 and the flowmeter controller 104 to determine an oil flow rate, a gas flow rate, a water flow rate, a salinity, a permittivity, and/or a conductivity of the fluid within the vessel 105. In the illustrated example, the computing device(s) 114 communicates the determined oil flow rate, gas flow rate, water flow rate, salinity, permittivity, and/or conductivity of the fluid to the network 112.

Additionally, the network 112 transmits the fluid parameters determined by the flowmeter controller 104, the flowmeter transmitter 108, and/or the computing device(s) 114 to the process control system 116. In some examples, the process control system 116 includes a data collection and distribution system that can be utilized to predict characteristics of the reservoir associated with the multiphase flowmeter system 1100. In some examples, the process control system 116 determines if the measurements by the multiphase flowmeter system 1100 are within a predetermined normal operating range. In some examples, the process control system 116 adjusts a choke valve at the surface, and/or a pump speed downhole used to lift the fluid to a surface in connection with the vessel 105, based on the determined fluid parameters.

In the illustrated example of FIG. 11, the network 112 communicates the parameters determined by the computing device(s) 114 to the flowmeter controller 104. In some examples, the report generator 1114 generates a report including fluid properties within the vessel 105 determined by the parameter determiner 1112, the flowmeter transmitter 108, and the computing device(s) 114. The report generator 1114 communicates the report to the database 1118, which stores the report with the fluid parameter(s) 1120. In some examples, the fluid parameter(s) 1120 can include parameters of the fluid within the vessel 105 at specific time intervals so that the productivity over time of the associated reservoir can be analyzed to evaluate system parameters, such as the economic viability, the production history matching, or the production forecast, for example, of the reservoir. Additionally, the report generator 1114 can generate one or more user interfaces on a computer screen to provide the report to an operator. In some examples, an operator can store the report from a first user interface and/or communicate a command to the command generator 1116 via a second user interface.

In the illustrated example of FIG. 11, the report generator 1114 can communicate the report to the command generator 1116. In the illustrated example, the command generator 1116 determines an adjustment to the operating radio frequency of the electromagnetic signal so that accurate parameters of the fluid within the vessel 105 can be determined. For example, the command generator 1116 can generate a command to the signal generator 1110 to generate higher frequency signals (e.g., 960 MHz) when the water-liquid ratio (WLR) is lower than a predetermined threshold (e.g., WLR<0.35). Further, the signal generator 1110 generates an electromagnetic signal at the operating radio frequency determined by the command generator 1116 and transmits the electromagnetic signal to the signal transmitter(s) 1102.

While an example manner of implementing the flowmeter controller 104 of FIGS. 1, 2, and/or 11 is illustrated in FIG. 11, one or more of the elements, processes and/or devices illustrated in FIG. 11 may be combined, divided, re-arranged, omitted, eliminated and/or implemented in any other way. Further, the example sensor interface 1208, the example signal generator 1110, the example parameter determiner 1112, the example report generator 1114, the example command generator 1116, the example database 1118, the example fluid parameter(s) 1120 and/or, more generally, the example flowmeter controller 104 of FIGS. 1, 2, and/or 11 may be implemented by hardware, software, firmware and/or any combination of hardware, software and/or firmware. Thus, for example, any of the example sensor interface 1108, the example signal generator 1110, the example parameter determiner 1112, the example report generator 1114, the example command generator 1116, the example database 1118, the example fluid parameter(s) 1120 and/or, more generally, the example flowmeter controller 104 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate array(s) (FPGA(s)) and/or field programmable logic device(s) (FPLD(s)). When reading any of the apparatus or system claims of this patent to cover a purely software and/or firmware implementation, at least one of the example, sensor interface 1108, the example signal generator 1110, the example parameter determiner 1112, the example report generator 1114, the example command generator 1116, the example database 1118, the example fluid parameter(s) 1120 is/are hereby expressly defined to include a non-transitory computer readable storage device or storage disk such as a memory, a digital versatile disk (DVD), a compact disk (CD), a Blu-ray disk, etc. including the software and/or firmware. Further still, the example flowmeter controller 104 of FIGS. 1, 2, and/or 10 may include one or more elements, processes and/or devices in addition to, or instead of, those illustrated in FIG. 11, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 12:
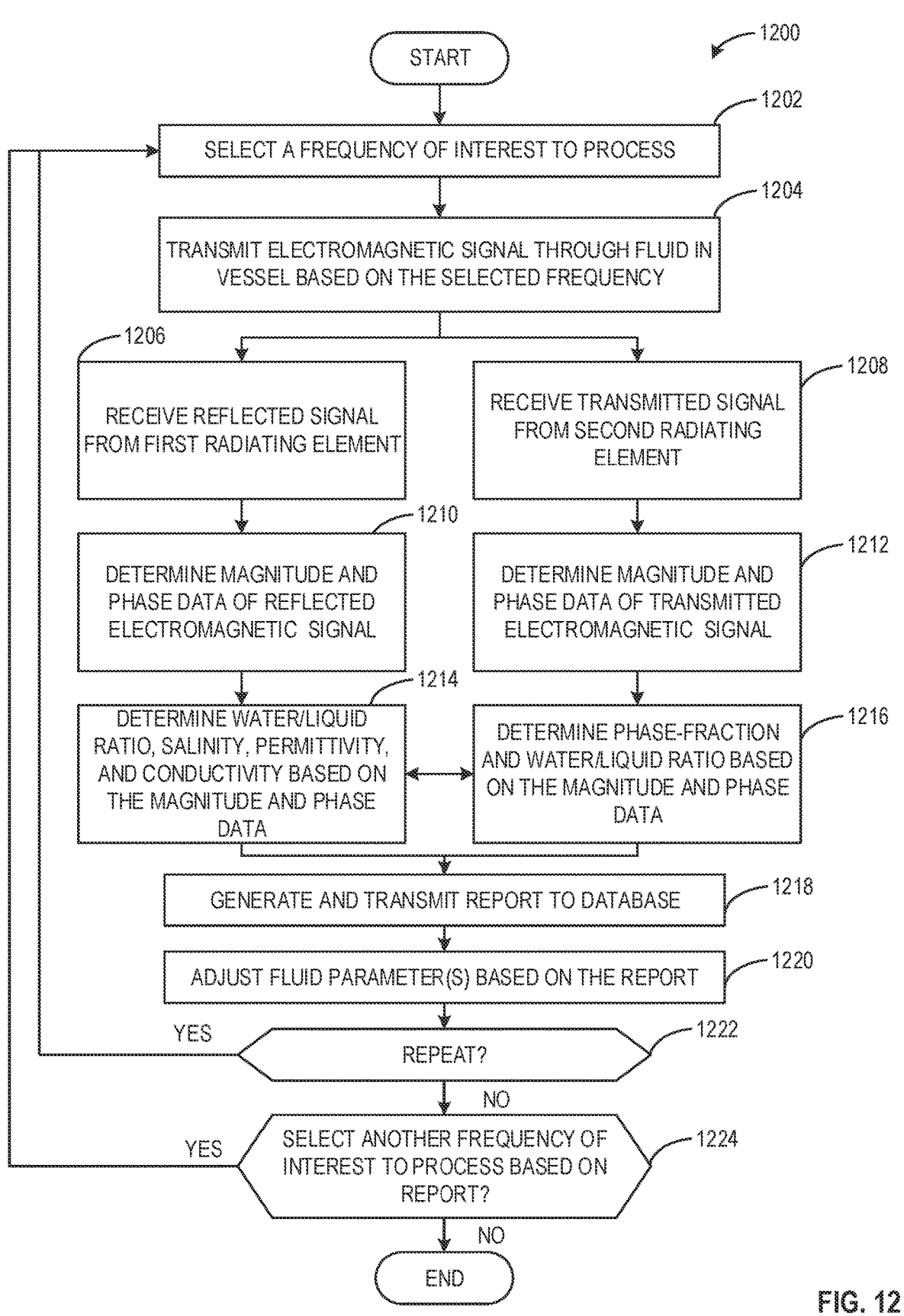
FIG. 12 is a flowchart representative of example machine-readable instructions that may be executed to implement the flowmeter controller of FIGS. 1, 2, and/or 11 to determine physical properties of a multiphase fluid in the example vessel of FIGS. 1 and/or 2.

A flowchart representative of example hardware logic, machine readable instructions, hardware implemented state machines, and/or any combination thereof for implementing the example flowmeter controller 104 of FIGS. 1, 2, 10, and/or 11 is shown in FIG. 12. The machine readable instructions may be one or more executable programs or portion(s) of an executable program for execution by a computer processor and/or processor circuitry, such as the processor 1312 shown in the example flowmeter controller 104 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowchart illustrated in FIG. 12, many other methods of implementing the example flowmeter controller 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example process of FIG. 12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 12 is a flowchart representative of example machine-readable instructions 1200 that can be executed to implement the flowmeter controller 104 of FIGS. 1, 2, 10, and/or 11 to determine physical properties of a multiphase fluid in the vessel 105 of FIGS. 1 and/or 2. At block 1202, the flowmeter controller 104 selects a frequency of interest to the process. For example, the command generator 1116 (FIG. 11) can communicate the frequency to the RF signal generator 1110 (FIG. 11) of the flowmeter controller 104. In some examples, the frequency of interest to the process is based on fluid parameters determined by previous measurements.

At block 1204, the flowmeter controller 104 transmits the electromagnetic signal through the fluid in the throat section 107 of the vessel 105 based on the selected frequency. For example, the signal generator 1110 (FIG. 11) can generate the electromagnetic signal to be transmitted based on the selected frequency. In such examples, the signal generator 1110 transmits, via the electrical RF cable(s) with associated RF connector(s) 110 (FIG. 10), the electromagnetic signal to the signal transmitter(s) (e.g., radiating element 204A) 1102 (FIG. 11). In some such examples, the signal transmitter(s) 1102 then transmits the signal through the fluid in the throat section 107 of the vessel 105.

At block 1206, the flowmeter controller 104 receives a reflected signal from the first radiating element 204A (FIG. 10). For example, the reflected signal receiver(s) 1104 (FIG. 11) (e.g., radiating element 204A) receive the electromagnetic signal after it reflects off a fluid near the reflected signal receiver(s) 1104. In some such examples, the reflected signal receiver(s) 1104 can communicate the reflected signal to the sensor interface 1108 of the flowmeter controller 104. Specifically, the first radiating element 204A can transmit the signal received from the signal generator 1110 and receive a reflection signal after the electromagnetic signal reflects off a fluid in the throat section 107 of the vessel 105 near the PRMW 212 associated with the first radiating element 204A.

At block 1208, the flowmeter controller 104 receives a transmitted signal from the second radiating element 204B (FIG. 10). For example, the transmitted signal receiver(s) 1106 (FIG. 11) (e.g., radiating element 204B) receive the electromagnetic signal after the electromagnetic signal is transmitted across the throat section 107 of the vessel 105. In some such examples, the transmitted signal receiver(s) 1106 provide the electromagnetic signal to the sensor interface 1108 of the flowmeter controller 104. Specifically, the second radiating element 204B is positioned across the throat section 107 of the vessel 105 from the first radiating element 204A to receive the electromagnetic signal transmitted by the first radiating element 204A after it travels through the fluid in the throat section 107 of the vessel 105.

At block 1210, the flowmeter controller 104 determines magnitude and phase data of the reflected electromagnetic signal. For example, the sensor interface 1108 can communicate the reflected electromagnetic signal to the parameter determiner 1112 (FIG. 11), which processes the reflected electromagnetic signal to determine the magnitude and phase data. In some examples, microwave sensor electronics 106 (FIG. 10) process the reflected electromagnetic signal to determine the magnitude and phase data.

At block 1212, the flowmeter controller 104 determines magnitude and phase data of the transmitted electromagnetic signal. For example, the sensor interface 1108 can communicate the transmitted electromagnetic signal to the parameter determiner 1112. In some such examples, the parameter determiner 1112 can process the transmitted electromagnetic signal received to determine the magnitude and phase data. In some examples, microwave sensor electronics 106 process the transmitted electromagnetic signal to determine the magnitude and phase data.

At block 1214, the flowmeter controller 104 determines a water-liquid ratio, salinity, permittivity, and conductivity based on the magnitude and phase data. For example, the parameter determiner 1112 utilizes the magnitude and phase data of the reflected electromagnetic signal to determine a water-liquid ratio. The flowmeter transmitter 108 (FIGS. 10 and 11) communicates the flow pressure, temperature, and differential pressure measured by a pressure sensor, a temperature sensor, and a differential pressure sensor respectively, to the flowmeter controller 104. In some examples, the flowmeter controller 104 provides the measurements from the flowmeter transmitter 108 and the parameter determiner 1112 to the computing device(s) 114 (FIGS. 10 and 11) through the network 112 (FIG. 11). In some such examples, the computing device(s) 114 determines the salinity, permittivity, conductivity, and flow rate of the fluid within the vessel 105 based on the magnitude, phase, flow pressure, temperature, and/or differential pressure parameters. Alternatively, in some examples, the parameter determiner 1112 utilizes the measurements from the flowmeter transmitter 108 to determine the salinity, permittivity, and conductivity, and flow rate of the fluid within the vessel 105.

At block 1216, the flowmeter controller 104 determines a phase-fraction (e.g., a gas holdup), and a water-liquid ratio based on the magnitude and phase data from two or more radiating elements (e.g., reflected signal receivers 1104, transmitted signal receivers 1106) 204. For example, the parameter determiner 1112 utilizes the determined magnitude and phase data for further analysis and determines the phase-fraction and water-liquid ratio of the fluid in the vessel 105. In some examples, the microwave sensor electronics 106 determine the water-liquid ratio and phase-fraction based on the magnitude and phase data.

At block 1218, the flowmeter controller 104 generates and transmits a report to the database 1118 (FIG. 11). For example, the parameter determiner 1112, the flowmeter transmitter 108, and/or the computing device(s) 114 provide determined properties of the fluid within the vessel 105 to the report generator 1114 (FIG. 11) of the flowmeter controller 104. Specifically, the report generator 1114 generates a report including the determined properties of the fluid and transmits the report to a database 1118. In some examples, the report generator 1114 transmits the report to the process control system 116 (FIGS. 10 and 11).

At block 1220, the flowmeter controller 104 adjusts fluid parameter(s) based on the report. For example, the report generator 1114 provides the report to the command generator 1116 (FIG. 11). In some such examples, the command generator 1116 can transmit a command to the process control system 116 based on the determined water-liquid ratio. Further, the process control system 116 can adjust a choke valve at the surface to control the flow rate and/or gas volume fraction within the vessel 105 based on the measured flow properties. In some examples, the process control system 116 can adjust a reservoir water-injection strategy to enhance oil recovery based on the measured flow parameters (e.g., changes in water salinity, changes in WLR) of the multiphase fluid of one or more production wells monitored by flowmeter(s). In some examples, the process control system 116 can optimize the production of a well implemented with an artificial lift system and monitored by a flowmeter, by reducing the gas volume fraction experienced by a downhole electric submersible pump, by adjusting the pump operating speed, and/or adjusting the opening of a gas-lift valve. In some examples, the process control system 116 may help shut or abandon the well if the well WLR is excessively high and, thus the well has no economic value to continue the production.

At block 1222, the machine-readable instruction 1200 may be repeated if a long measurement duration is needed. If the long measurement duration is needed, the machine-readable instructions 1200 return to block 1202, otherwise the machine-readable instructions continue to block 1224.

At block 1224, the flowmeter controller 104 determines whether there is another electromagnetic frequency of interest to the process. If there is another frequency of interest to the process, the machine-readable instructions 1200 return to block 1202. For example, the flowmeter controller 104 compares the determined water-liquid ratio to a threshold to determine if there is another frequency electromagnetic signal of interest to the process. If there is no other frequency of interest to the process, the machine-readable instruction 1200 end. For example, if the determined fluid parameters remain relatively consistent after multiple frequencies of the electromagnetic signal have been transmitted, the flowmeter controller 104 determines that the fluid within the vessel is in a steady state no further electromagnetic signals are to be transmitted at that time.

Figure 13:
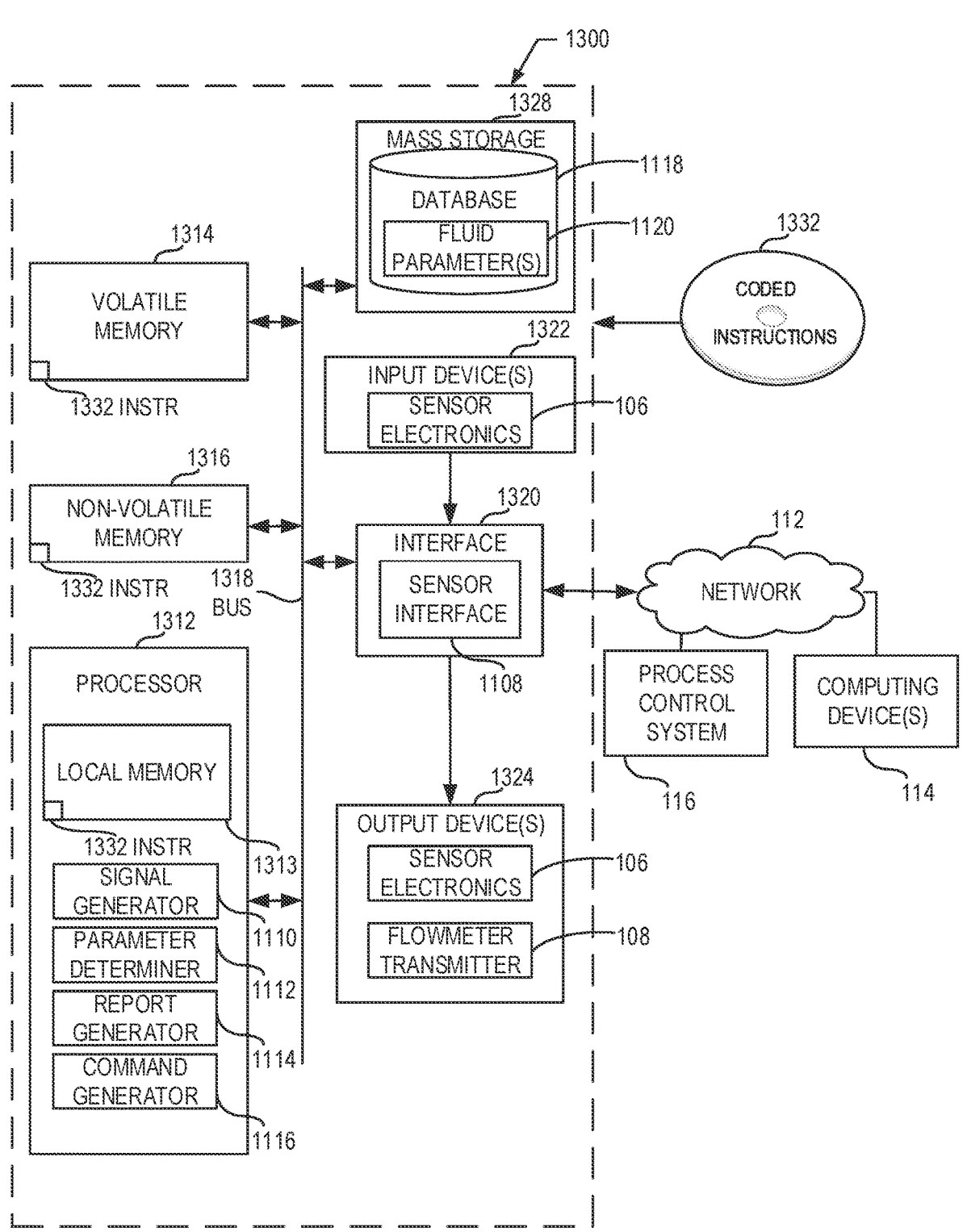
FIG. 13 is a block diagram of an example processing platform structured to execute the example machine-readable instructions of FIG. 12 to implement the flowmeter controller of FIGS. 1, 2, and/or 11.

FIG. 13 is a block diagram of an example processor platform 1300 structured to execute the instructions of FIG. 12 to implement the flowmeter controller 104 of FIGS. 1, 2, 10, and/or 11. The processor platform 1300 can be, for example, a server, a personal computer, a workstation, a self-learning machine (e.g., a neural network), a mobile device (e.g., a cell phone, a smart phone, a tablet such as an iPad™), a headset or other wearable device, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example signal generator 1110, the example parameter determiner 1112, the example command generator 1116, and the example report generator 1114 of FIG. 11.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface. In the illustrated example, the interface circuit 1320 implements the example sensor interface 1108 of FIG. 11.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system. In the illustrated example, the input devices 1322 implements the microwave sensor electronics 106 of FIG. 1.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. In the illustrated example, the output devices 1324 include the microwave sensor electronics 106, flowmeter transmitter 108. The interface circuit 1320 of the illustrated example, thus, typically includes a graphics driver card, a graphics driver chip and/or a graphics driver processor.

The interface circuit 1320 of the illustrated example also includes a communication device such as the sensor interface 1108, a transmitter, a receiver, a transceiver, a modem, a residential gateway, a wireless access point, and/or a network interface to facilitate exchange of data with external machines (e.g., computing devices of any kind) via a network 112. The communication can be via, for example, an Ethernet connection, a digital subscriber line (DSL) connection, a telephone line connection, a coaxial cable system, a satellite system, a line-of-site wireless system, a cellular telephone system, etc. In this example, the network 112 facilitates communication between the computing device(s) 114 and the process control system 116 of FIG. 1 with the processor platform 1300 of FIG. 13.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives. In the illustrated example, the mass storage device 1328 implements the database 1118 and the associated fluid parameter(s) 1120 of FIG. 11.

The machine executable instructions 1200 of FIG. 12 may be stored in the mass storage device 1328, in the volatile memory 1314, in the non-volatile memory 1316, and/or on a removable non-transitory computer readable storage medium such as a CD or DVD.

From the foregoing, it will be appreciated that the above disclosed methods, apparatus and articles of manufacture relate to example multiphase flowmeters that may be used in any suitable situation such as, for example, subsea operations, topside operations, land-based operations, offshore-platform operations, etc. In some examples, the multiphase flowmeters disclosed herein may be used to measure phase flow rate, phase fraction, pressure, and temperature when the example flowmeters are disposed such that the fluid flows vertically, horizontally, and/or in an inclined manner in which gravity acts substantially asymmetrically on the flow sections, inlet manifold and/or outlet manifold of the multiphase flowmeter. In some examples, the aperture antenna assemblies of the multiphase flowmeters and associated pressure vessel apparatuses disclosed herein may be used to measure phase fraction, pressure, and temperature of fluids without a Venturi throat section (e.g. may be used at a full-bore, uniform diameter, vessel 105).

In the specification and appended claims: the terms "connect," "connection," "connected," "in connection with," and "connecting" are used to mean "in direct connection with" or "in connection with via one or more elements;" and the term "set" is used to mean "one element" or "more than one element." Further, the terms "couple," "coupling," "coupled," "coupled together," and "coupled with" are used to mean "directly coupled together" or "coupled together via one or more elements." As used herein, the terms "up" and "down," "upper" and "lower," "upwardly" and "downwardly," "upstream" and "downstream;" "above" and "below;" and other like terms indicating relative positions above or below a given point or element are used in this description to more clearly describe some embodiments of the disclosure.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Example methods, apparatus, systems, and articles of manufacture to perform flowmeter aperture antenna transmission and pressure retention are disclosed herein. Further examples and combinations thereof include the following:

Example 1 includes an aperture antenna assembly of a multiphase flowmeter to measure properties of a fluid in a vessel, the aperture antenna assembly comprising at least one radiating element to transmit or receive an electromagnetic signal along at least one measurement plane orthogonal to a direction of flow of the fluid in the vessel, and a pressure retaining member to prevent the fluid from entering the aperture antenna assembly through a measurement window of the aperture antenna assembly. At least a portion of the pressure retaining member separates the radiating element and the fluid. The aperture antenna assembly also includes a metal housing (with or without slits), the pressure retaining member being at least partially within the metal housing, and the radiating element being coupled to the metal housing.

Example 2 includes the aperture antenna assembly of example 1, wherein the metal housing is coupled to an exterior surface of the vessel by the pressure retaining member.

Example 3 includes the aperture antenna assembly of example 1, wherein the pressure retaining member includes at least one of a low-loss dielectric material or a substantially high dielectric constant materia. Such material may substantially improve a transmission gain of the electromagnetic signal transmitted or received by the radiating element.

Example 4 includes the aperture antenna assembly of example 3, wherein the low-loss dielectric material is polyether ether ketone.

Example 5 includes the aperture antenna assembly of example 1, wherein the pressure retaining member includes a high mechanical-strength ceramic material. Such material may improve a pressure-rating and a temperature-rating of the measurement window.

Example 6 includes the aperture antenna assembly of example 1, further including a controller to determine fluid properties of the fluid in response to the at least one radiating element receiving the electromagnetic signals.

Example 7 includes the aperture antenna assembly of example 1, wherein the at least one radiating element comprises a first and a second radiating elements. The second radiating element may be positioned within the metal housing behind the first radiating element and orthogonally aligned with the first radiating element.

Example 8 includes the aperture antenna assembly of example 1, wherein a material of the radiating element includes at least one of beryllium copper, bronze, or brass.

Example 9 includes the aperture antenna assembly of example 8, wherein an exterior surface of the radiating element includes a gold plating.

Example 10 includes the aperture antenna assembly of example 1, wherein the metal housing is a metal housing with slits, the metal housing with slits including a first section, a second section, and a third section. The second section may be positioned between the first section and the third section, the first section and the third section may be coupled to an exterior surface of the vessel, the second section may be coupled to the first section and the third section, and respective first ends of the first radiating element and the second radiating element may be coupled to the second section.

Example 11 includes the aperture antenna assembly of example 10, further including an electrical coaxial connector coupled to a second end of the radiating element. The electrical coaxial connector may be positioned within the second section of the metal housing.

Example 12 includes the aperture antenna assembly of example 11, wherein the electrical coaxial connector is removably coupled to the metal housing via a flange-mount and screws, the second section of the metal housing is removable via uncoupling the electrical coaxial connector from the metal housing.

Example 13 includes the aperture antenna assembly of example 10, wherein the slits include a first set of slits, the first set of slits including a first gap disposed between the first section and the second section and a second gap disposed between the second section and the third section. The first gaps and the second gaps may be positioned substantially parallel to the radiating element.

Example 14 includes the aperture antenna assembly of example 13, wherein the slits include a second set of slits that extend at least partially through the first section and the third section, ones of the second set of slits being substantially orthogonal to the radiating element.

Example 15 includes the aperture antenna assembly of example 10, wherein the slits are configured to enhance a transmission gain of the electromagnetic signal via a constructive interference of electromagnetic fields inside the metal housing.

Example 16 includes the aperture antenna assembly of example 14, wherein respective ones of the first gaps and the second gaps of the first set of slits have a first width in a range of 0.5 to 2.0 millimeters and respective ones of the second set of slits have a width in a range of 0.5 to 2.0 millimeters.

Example 17 includes the aperture antenna assembly of example 1, further including electrical conductor shims disposed between the metal housing and the vessel or at least partially between the pressure retaining member and the vessel to provide electrical shielding among the first radiating element and the second radiating element.

Example 18 includes a multiphase flowmeter with a plurality of aperture antenna assemblies to measure properties of a fluid in a vessel, comprising a first aperture antenna assembly according to example 1 (or any of the examples 2-19), wherein the at least one radiating element of the first aperture antenna is at least one first radiating element. The multiphase flowmeter also includes a second aperture antenna assembly according to example 1 (or any of the examples 2-20), wherein the at least one radiating element of the second aperture antenna is at least one second radiating element. The first aperture antenna assembly is coupled to a first side of the vessel and the second aperture antenna assembly is coupled to a second side of the vessel. The at least one second radiating element includes one or more radiating elements respectively having one or more angular displacements with respect to the at least one first radiating element. The at least one first radiating element is configured to transmit an electromagnetic signal through the fluid, the at least one second radiating element is configured to receive the electromagnetic signal, and the at least one first radiating element is configured to receive at least a portion of the electromagnetic signal reflected by the fluid in the vessel.

Example 19 includes a pressure vessel apparatus of a multiphase flowmeter comprising a pressure retaining measurement window having an outer face and a shoulder, the outer face flush with an interior wall of a vessel, the outer face to be in fluid communication with a fluid included in the vessel, a seal to radially surround the shoulder of the pressure retaining measurement window, wherein the shoulder is substantially orthogonal to the outer face, an elastic member to provide a resistance force to the pressure retaining measurement window to counteract a fluid pressure within the vessel, a metal housing coupled between the pressure retaining measurement window and the elastic member, and a retaining member coupled to a side of the elastic member opposite the metal housing, the retaining member to maintain a relative position of the elastic member.

Example 20 includes the pressure vessel apparatus of example 19, wherein the elastic member is a Belleville washer.

Example 21 includes the pressure vessel apparatus of example 19, wherein the elastic member is preloaded to provide the resistance force.

Example 22 includes the pressure vessel apparatus of example 21, wherein the elastic member is preloaded with a bolt to be screwed into an opening of the metal housing or a body of the vessel, the bolt to be removed from the pressure vessel apparatus subsequent to applying the preload.

Example 23 includes the pressure vessel apparatus of example 19, wherein the retaining member is a retaining ring and the seal is an O-ring.

Example 24 includes the pressure vessel apparatus of example 19, wherein the pressure retaining measurement window includes a cavity filler at least partially extending from an inner face of the pressure retaining measurement window positioned opposite the outer face.

Example 25 includes the pressure vessel apparatus of example 19, wherein the pressure retaining measurement window and cavity filler include at least one of a low-loss dielectric material or a substantially high dielectric constant material.

Example 26 includes the pressure vessel apparatus of example 19, wherein the low-loss dielectric material includes polyether ether ketone.

Example 27 includes the pressure vessel apparatus of example 19, wherein the low-loss dielectric material and the substantially high dielectric constant material includes aluminum oxide.

Example 28 includes the pressure vessel apparatus of example 19, wherein the substantially high dielectric constant material of the cavity filler at least partially includes titanium dioxide.

Example 29 includes the pressure vessel apparatus of example 19, wherein the pressure retaining measurement window includes a high mechanical-strength ceramic material to improve a pressure-rating and a temperature-rating of the measurement window.

The invention claimed is:

1. An aperture antenna assembly of a multiphase flowmeter to measure properties of a fluid in a vessel, the aperture antenna assembly comprising:
   a metal housing;
   a pressure retaining member configured to prevent the fluid from entering the aperture antenna assembly through a measurement window of the aperture antenna assembly; and
   at least one radiating element coupled to the metal housing, wherein at least a portion of the pressure retaining member is configured to separate the at least one radiating element and the fluid, wherein the at least one radiating element is configured to transmit or receive an electromagnetic signal along at least one measurement plane orthogonal to a direction of flow of the fluid in the vessel, wherein the at least one radiating element comprises a first radiating element and a second radiating element, wherein the first radiating element is positioned between the second radiating element and the pressure retaining member, and wherein the first radiating element and the second radiating element form a cross-dipole antenna.

2. The aperture antenna assembly of claim 1, wherein the metal housing is coupled to an exterior surface of the vessel by the pressure retaining member.

3. The aperture antenna assembly of claim 1, wherein the pressure retaining member includes at least one of a low-loss dielectric material or a substantially high dielectric constant material.

4. The aperture antenna assembly of claim 3, wherein the low-loss dielectric material is polyether ether ketone.

5. The aperture antenna assembly of claim 1, wherein the pressure retaining member includes a high mechanical-strength ceramic material.

6. The aperture antenna assembly of claim 1, further including a controller configured to determine fluid properties of the fluid in response to at least one of the first radiating element or the second radiating element receiving the electromagnetic signal.

7. The aperture antenna assembly of claim 1, wherein the metal housing is a metal housing with slits, the metal housing with slits including a first section, a second section, and a third section, wherein the second section is positioned between the first section and the third section, wherein the first section and the third section are coupled to an exterior surface of the vessel, wherein the second section is coupled to the first section and the third section, and wherein a first end of the at least one radiating element is coupled to the second section.

8. The aperture antenna assembly of claim 7, further including an electrical coaxial connector coupled to a second end of at least one of the first radiating element or the second radiating element, wherein the electrical coaxial connector is positioned within the second section of the metal housing.

9. The aperture antenna assembly of claim 7, wherein the slits include a first set of slits, the first set of slits including a first gap disposed between the first section and the second section and a second gap disposed between the second section and the third section, the first gap and the second gap being positioned substantially parallel to at least one of the first radiating element or the second radiating element.

10. The aperture antenna assembly of claim 9, wherein the slits include a second set of slits that extend at least partially through the first section and the third section, ones of the second set of slits being substantially orthogonal to at least one of the first radiating element or the second radiating element.

11. The aperture antenna assembly of claim 10, wherein respective ones of the first gaps and the second gaps of the first set of slits have a first width in a range of 0.5 to 2.0 millimeters and respective ones of the second set of slits have a width in a range of 0.5 to 2.0 millimeters.

12. The aperture antenna assembly of claim 1, further including electrical conductor shims disposed between the metal housing and the vessel or at least partially between the pressure retaining member and the vessel.

13. An aperture antenna assembly of a multiphase flowmeter to measure properties of a fluid in a vessel, the aperture antenna assembly comprising:

at least one radiating element configured to transmit or receive an electromagnetic signal along at least one measurement plane orthogonal to a direction of flow of the fluid in the vessel;

a pressure retaining member configured to prevent the fluid from entering the aperture antenna assembly through a measurement window of the aperture antenna assembly, wherein at least a portion of the pressure retaining member separates the at least one radiating element and the fluid;

a metal housing, the pressure retaining member being at least partially within the metal housing, the at least one radiating element being coupled to the metal housing; and at least one electrical conductor shim disposed between the metal housing and the vessel or at least partially between the pressure retaining member and the vessel.

14. A multiphase flowmeter configured to measure properties of a fluid in a vessel, comprising:

a first aperture antenna assembly; and a second aperture antenna assembly, wherein the first aperture antenna assembly is coupled to a first side of the vessel and the second aperture antenna assembly is coupled to a second side of the vessel, and wherein the first the first aperture antenna assembly and the second aperture antenna assembly each comprise:

a metal housing;

a pressure retaining member configured to prevent the fluid from entering the respective aperture antenna assembly through a measurement window of the aperture antenna assembly; and at least one radiating element coupled to the metal housing, wherein:

at least a portion of the pressure retaining member is configured to separate the at least one radiating element and the fluid, wherein the at least one radiating element is configured to transmit or receive an electromagnetic signal along at least one measurement plane orthogonal to a direction of flow of the fluid in the vessel;

the at least one radiating element of the first aperture antenna assembly is configured to transmit an electromagnetic signal through the fluid and is configured to receive at least a portion of the electromagnetic signal reflected by the fluid in the vessel;

the at least one radiating element of the second antenna aperture assembly is configured to receive the electromagnetic signal; and the at least one radiating element of the second aperture antenna assembly is oriented at one or more angular displacements with respect to the at least one radiating element of the first aperture antenna assembly.

* * * * *